Sept. 22, 1931. R. L. DRAKE 1,823,889
FILLING AND CAPPING APPARATUS
Filed Aug. 13, 1924   17 Sheets-Sheet 4
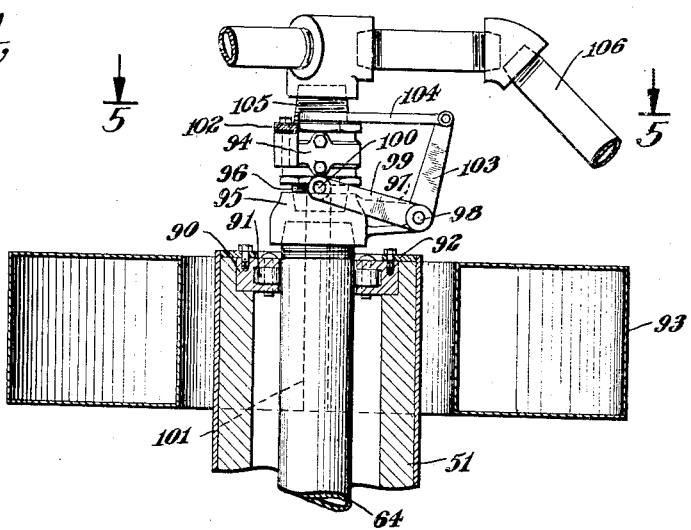
Fig.4,
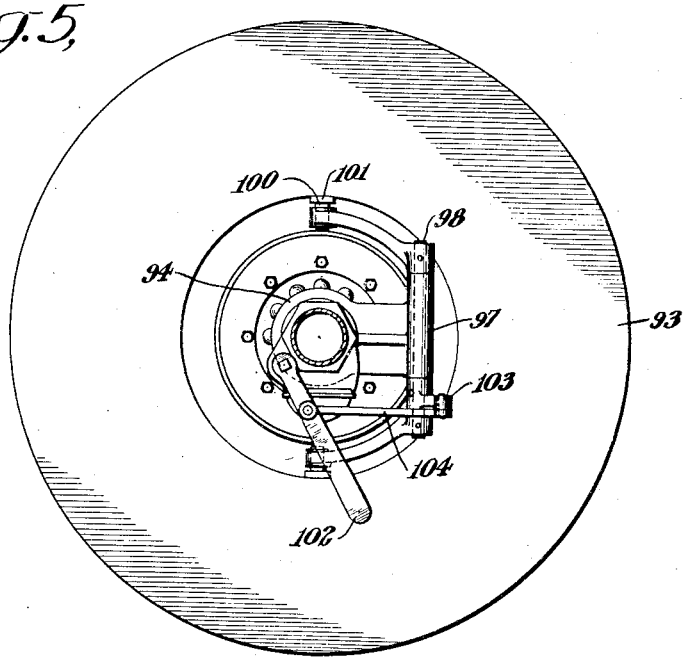
Fig.5,
Rollin L. Drake
Inventor
By his Attorney
R. J. Dearborn

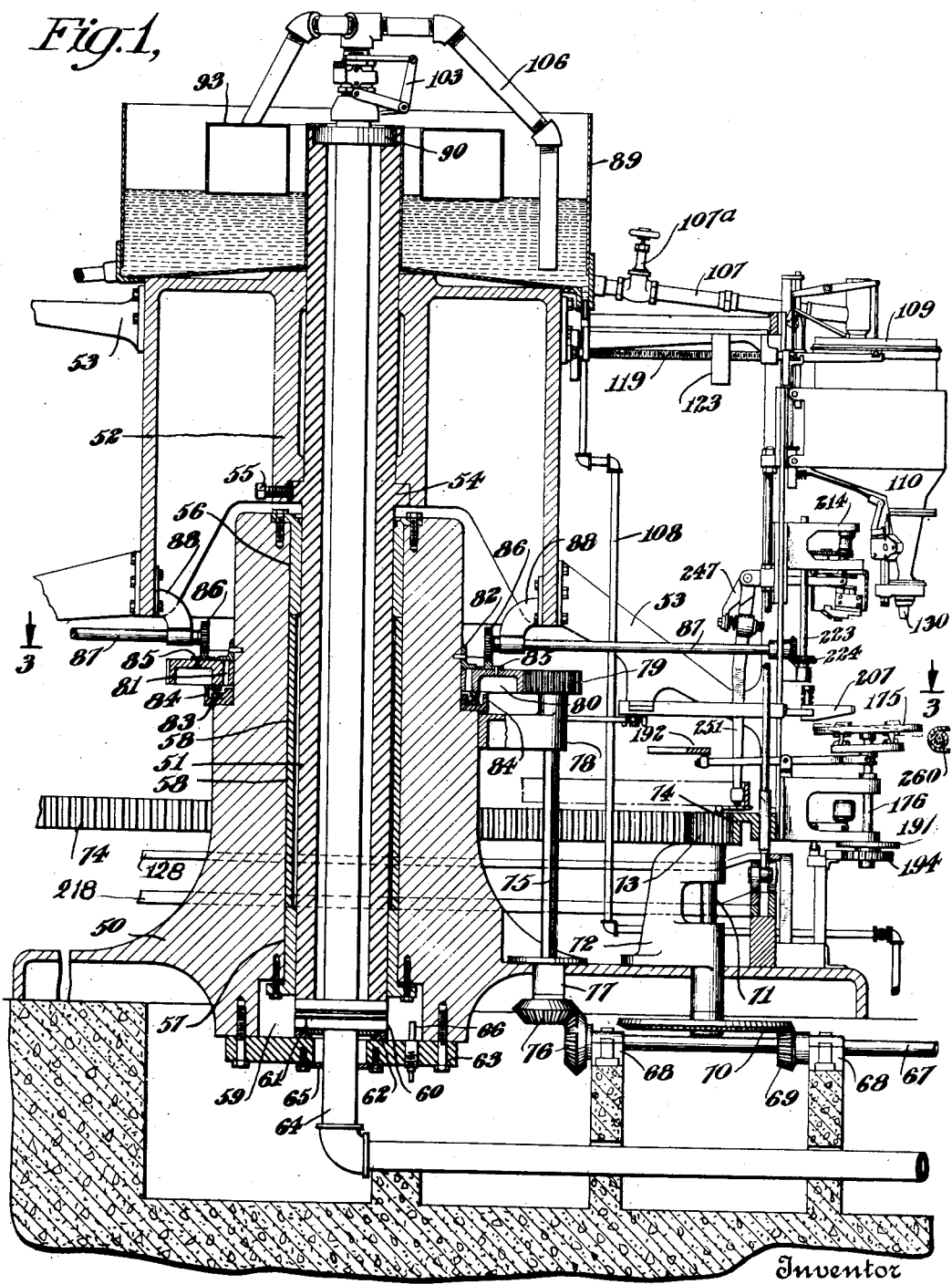

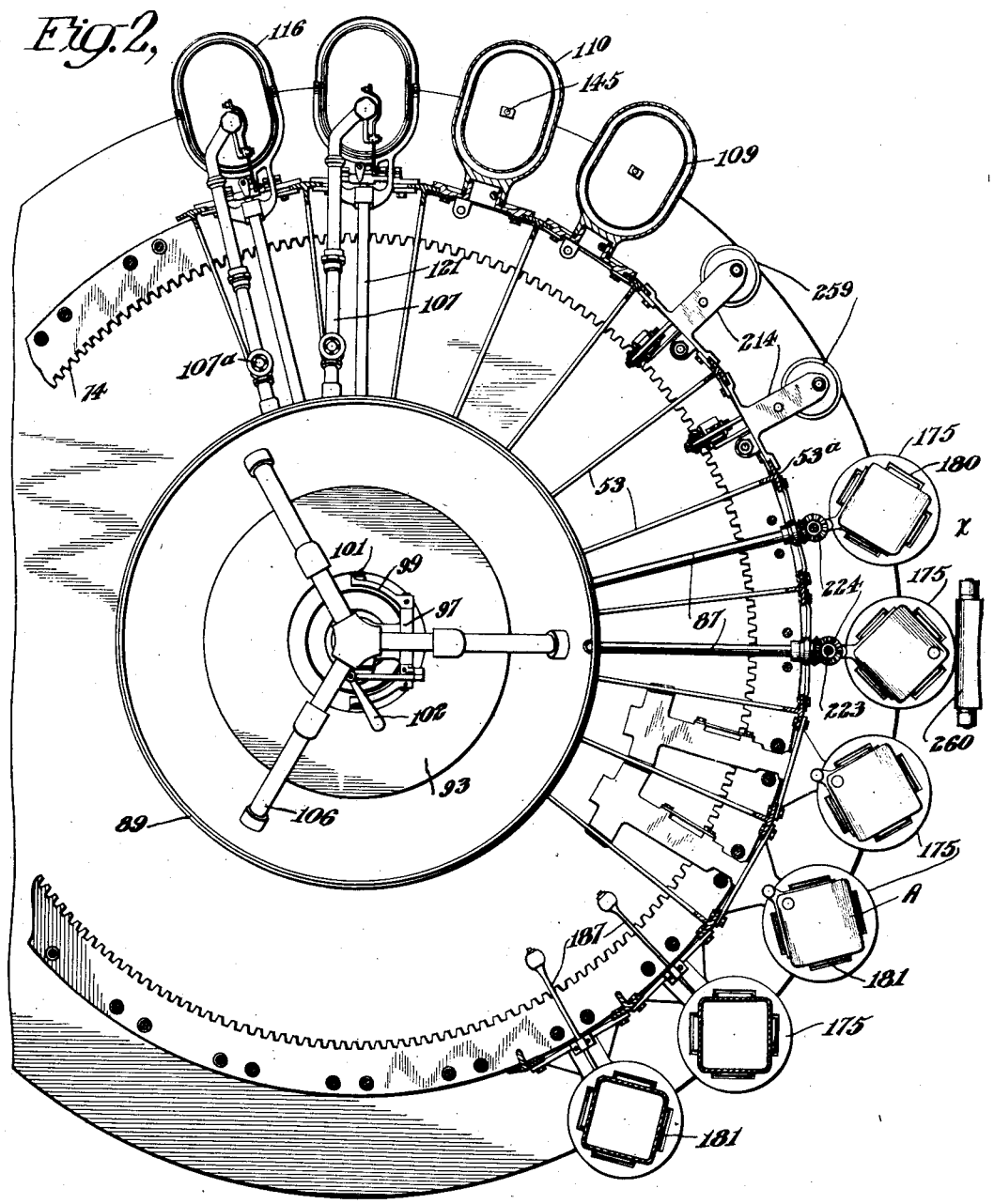

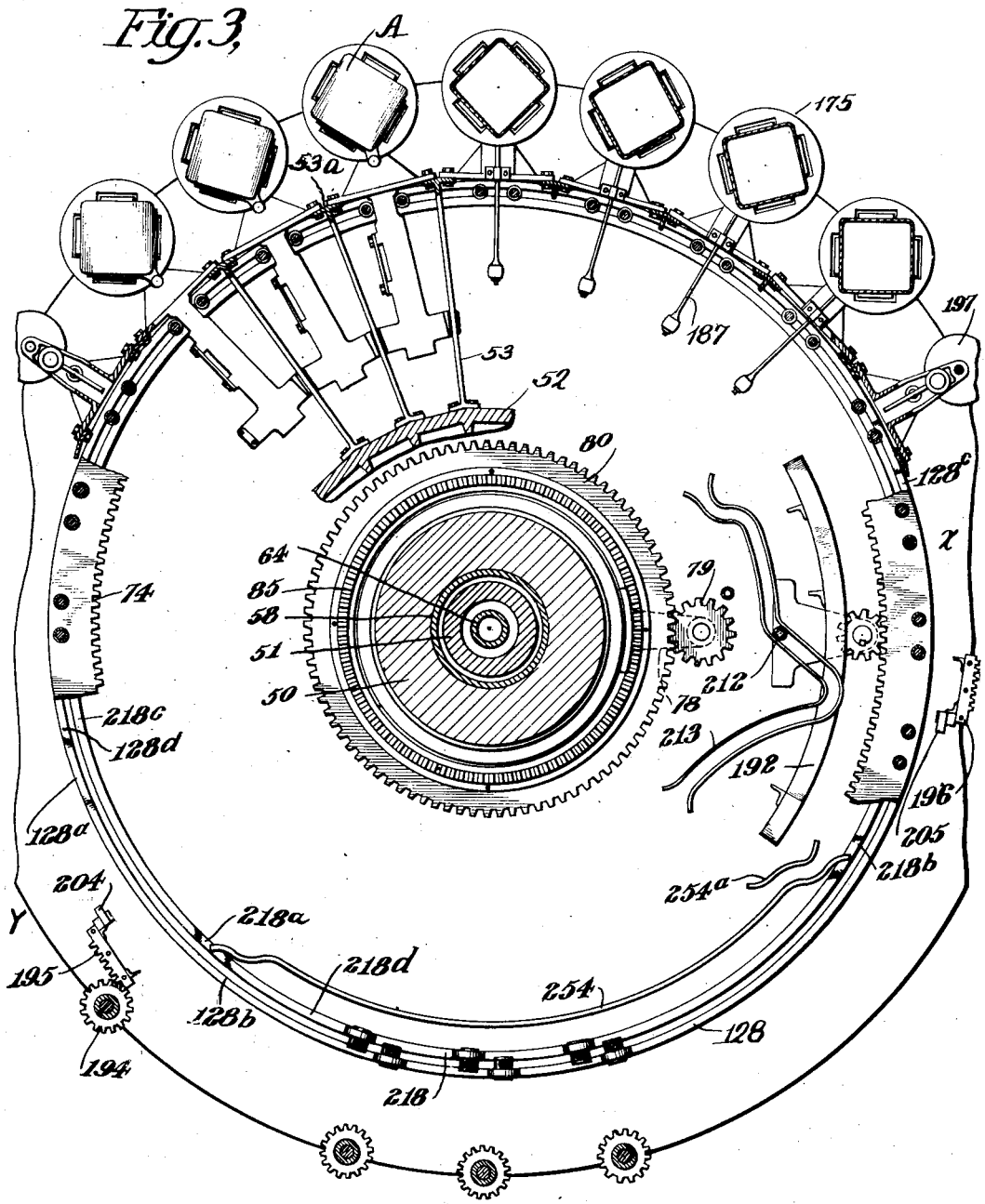

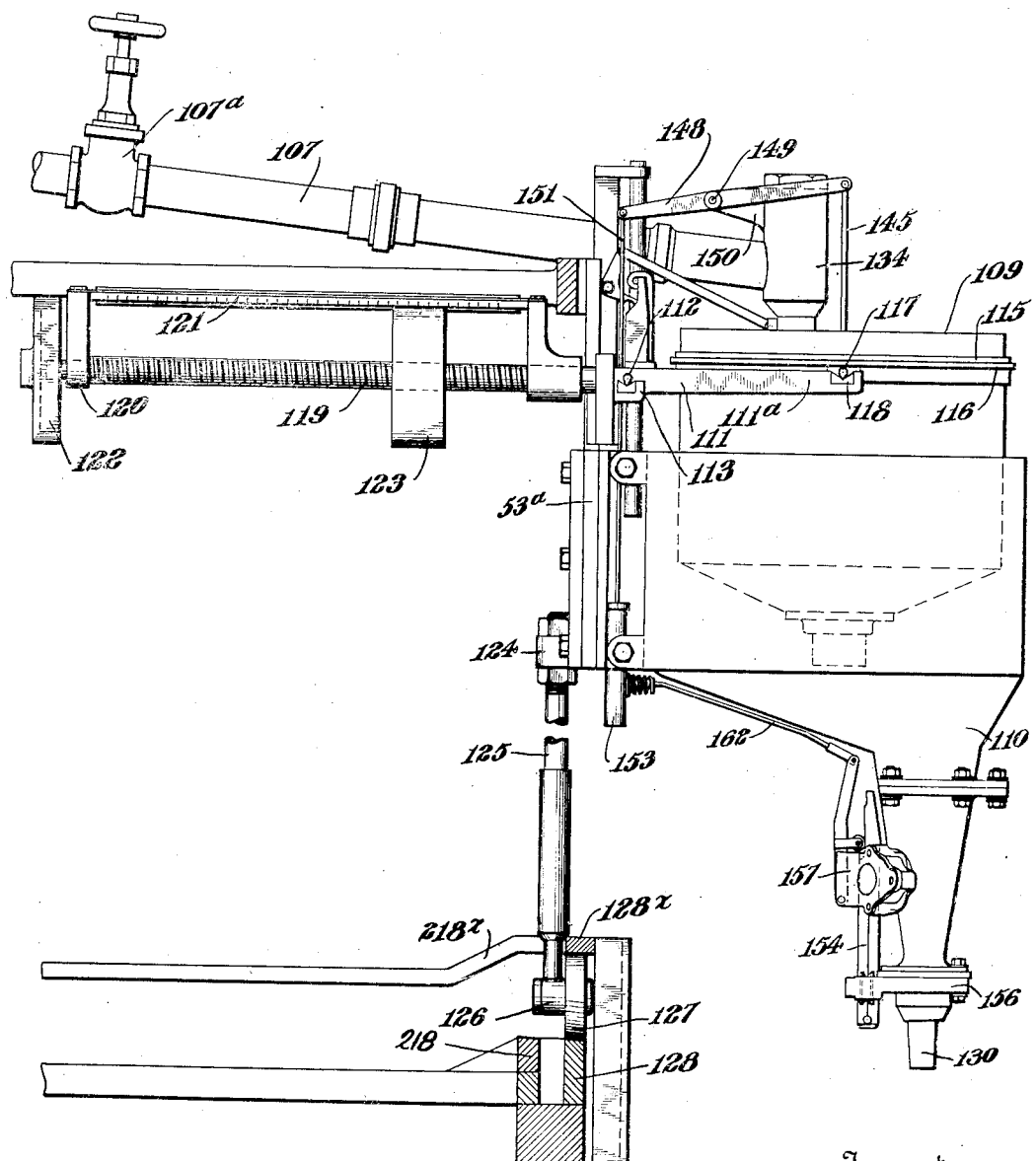

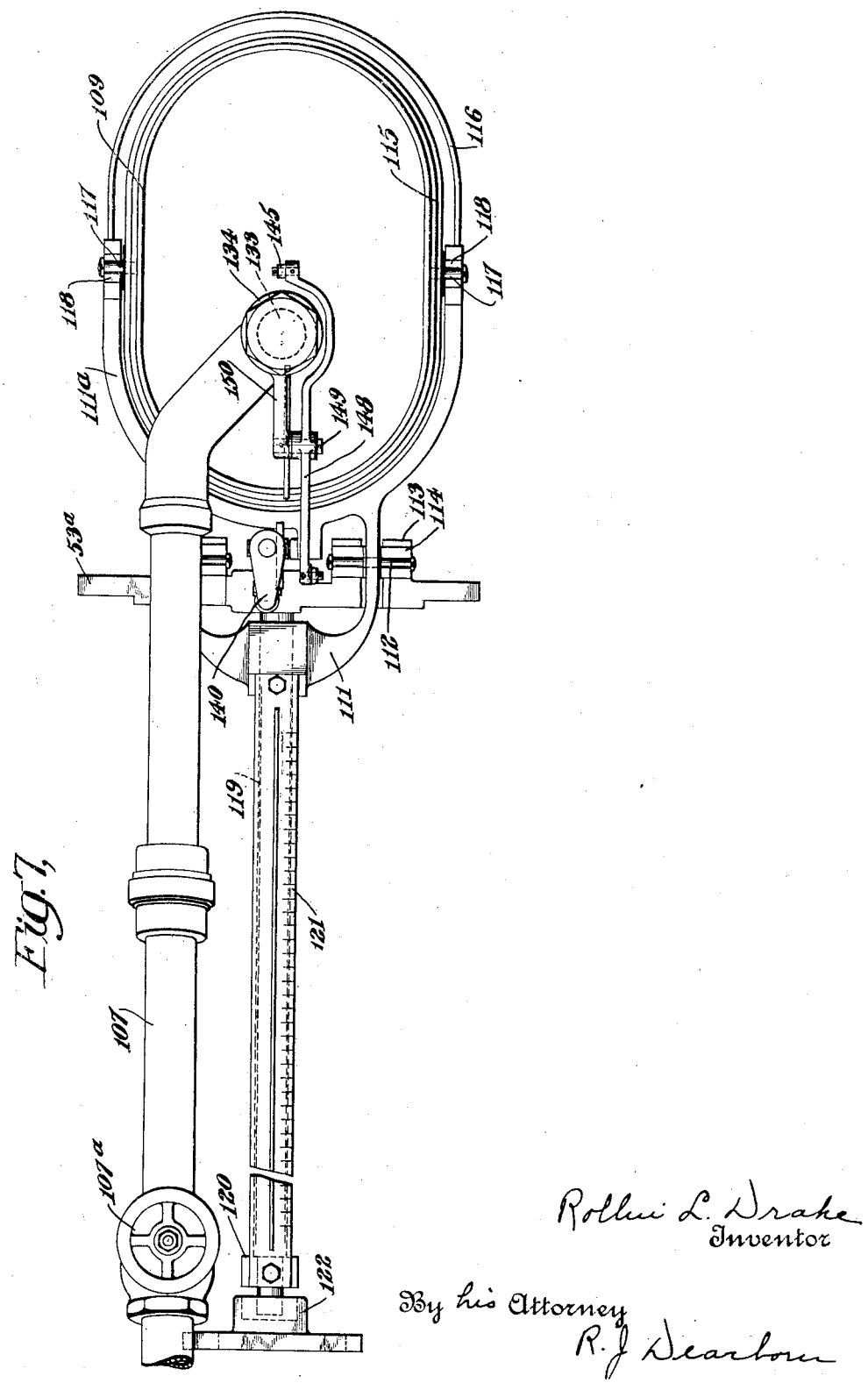

Sept. 22, 1931.  R. L. DRAKE  1,823,889
FILLING AND CAPPING APPARATUS
Filed Aug. 13, 1924   17 Sheets-Sheet 7
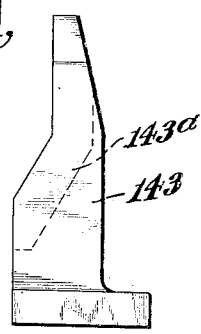
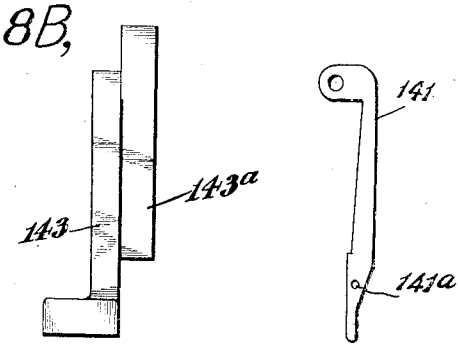
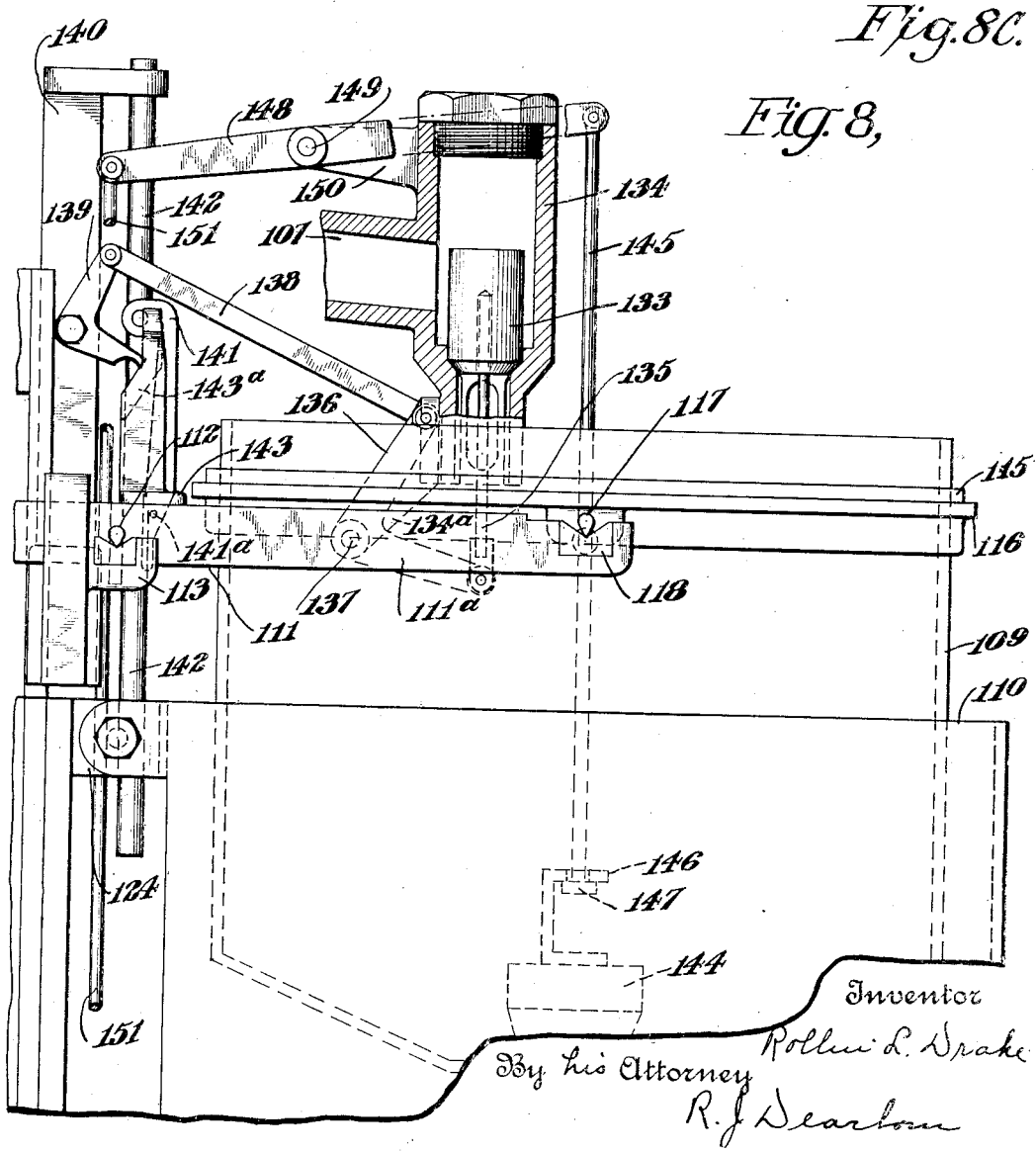
Inventor
Rollin L. Drake
By his Attorney
R. J. Dearborn

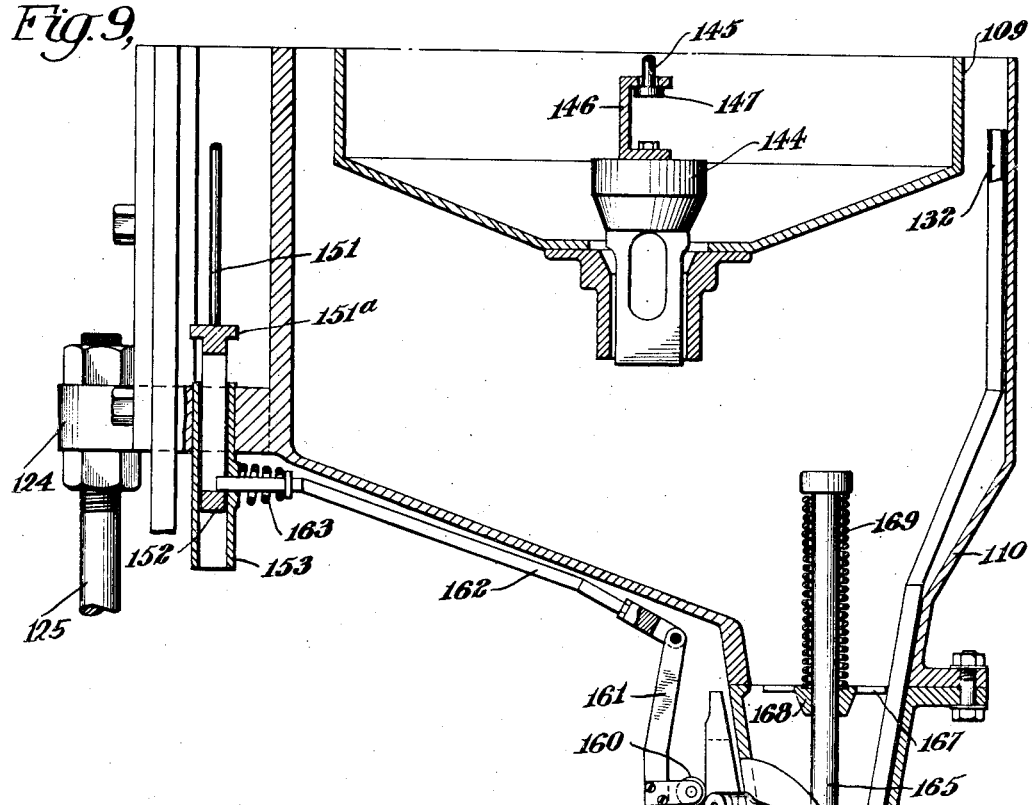
Fig.9,
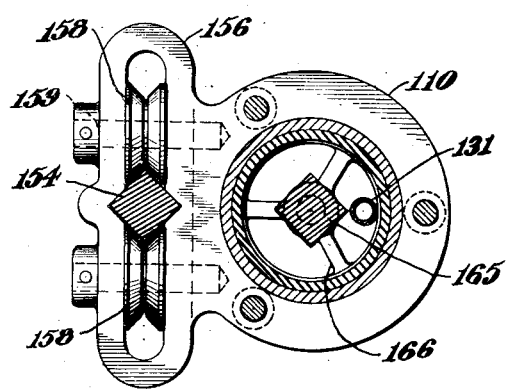
Fig.10,
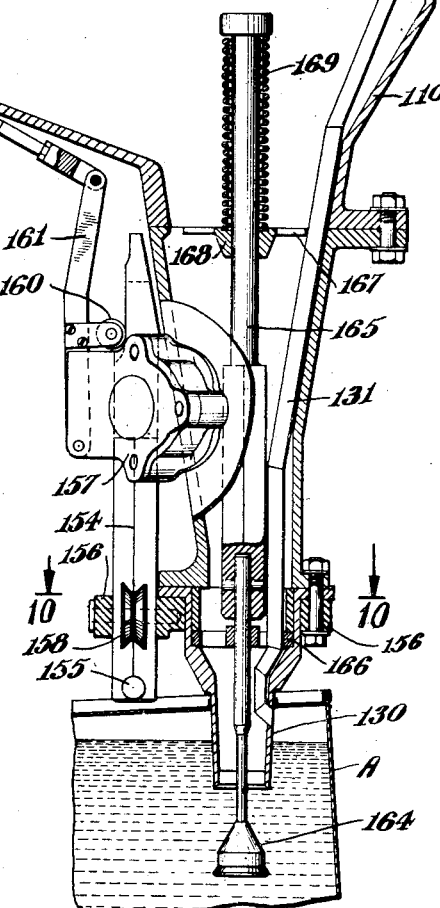

Sept. 22, 1931.  R. L. DRAKE  1,823,889
FILLING AND CAPPING APPARATUS
Filed Aug. 13, 1924   17 Sheets-Sheet 9

Rollin L. Drake
Inventor

By his Attorney
R. J. Dearborn

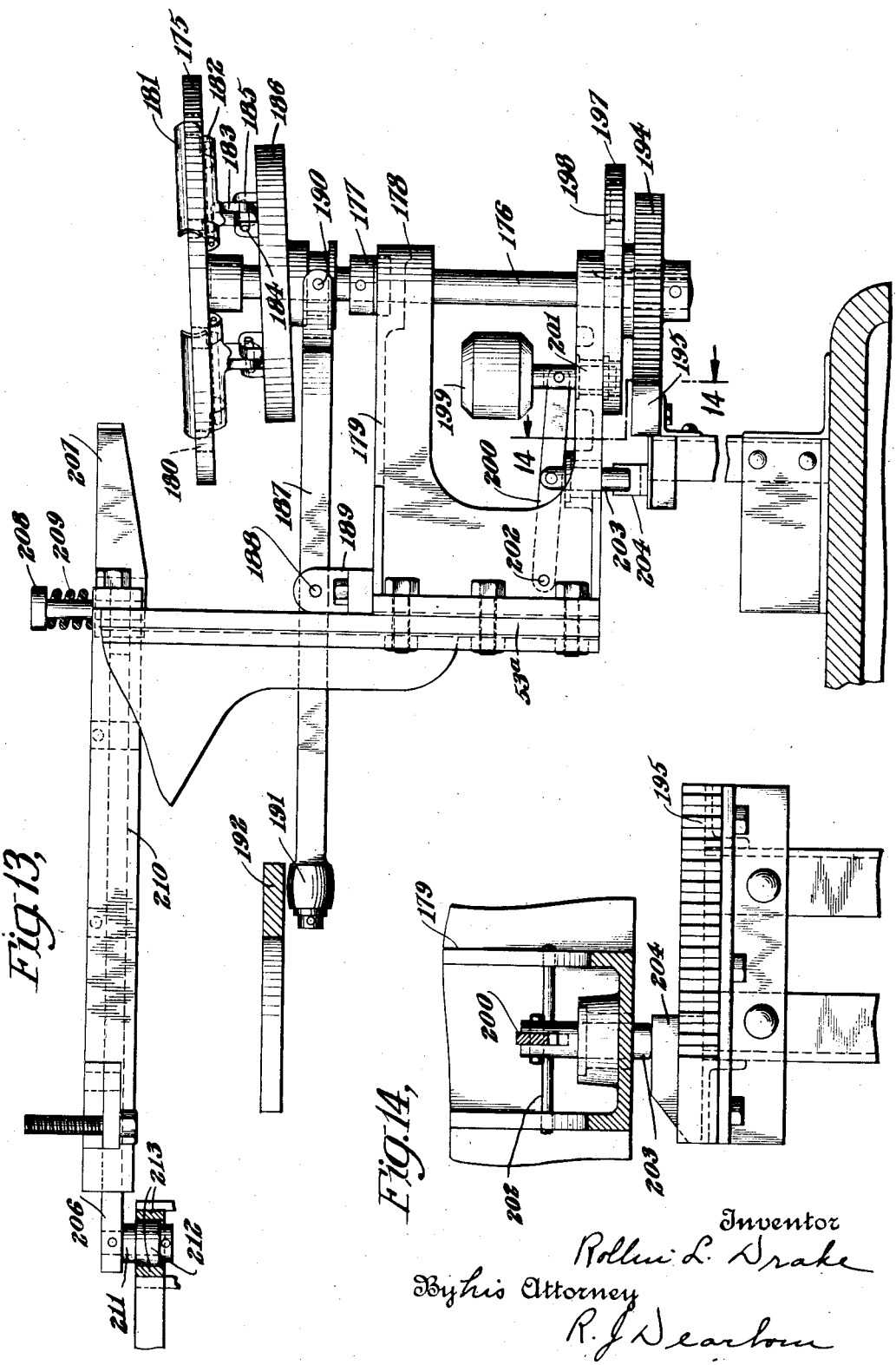

Sept. 22, 1931.  R. L. DRAKE  1,823,889
FILLING AND CAPPING APPARATUS
Filed Aug. 13, 1924   17 Sheets-Sheet 11
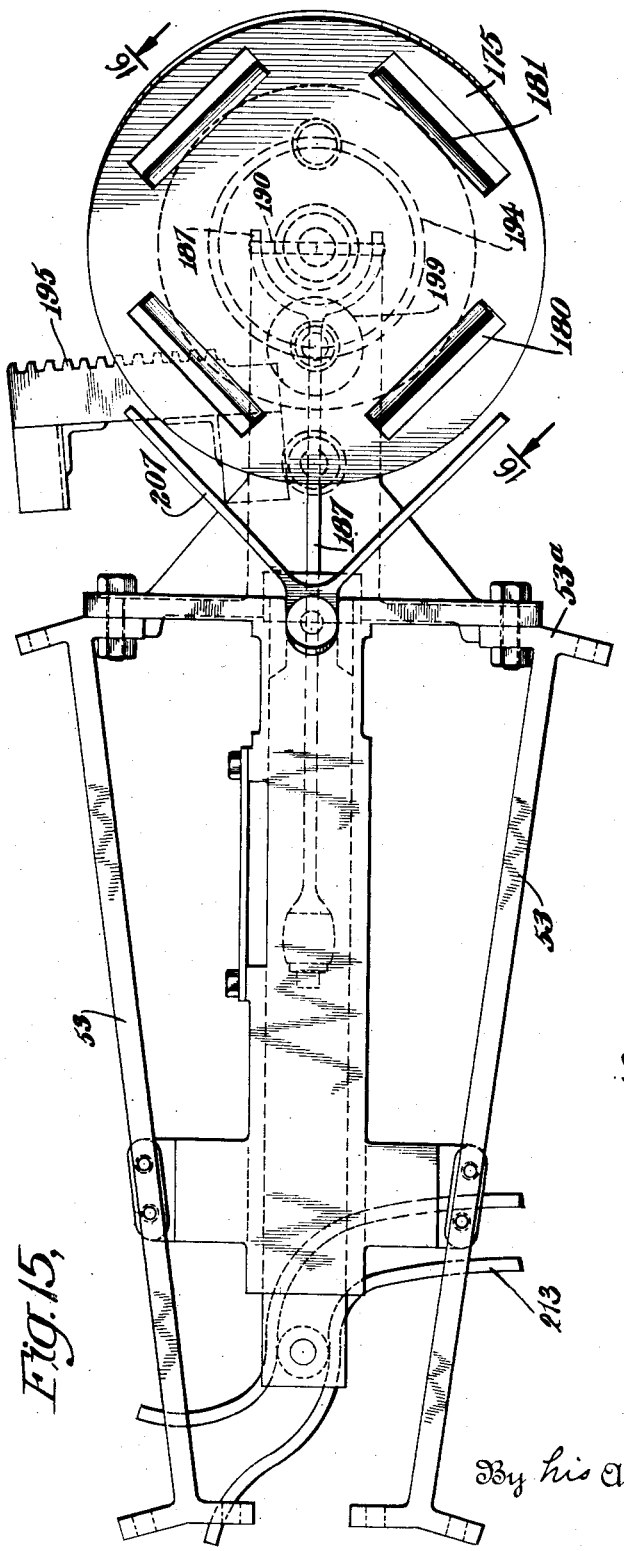
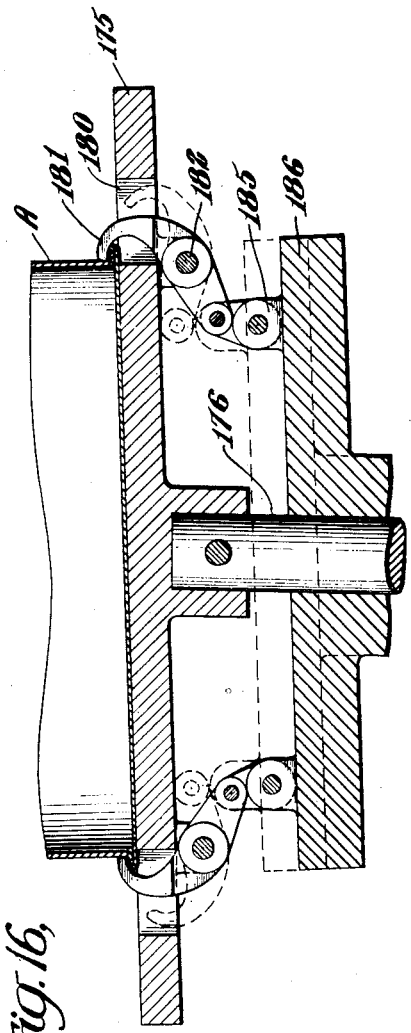
Rollin L. Drake
Inventor
By his Attorney
R. J. Dearborn

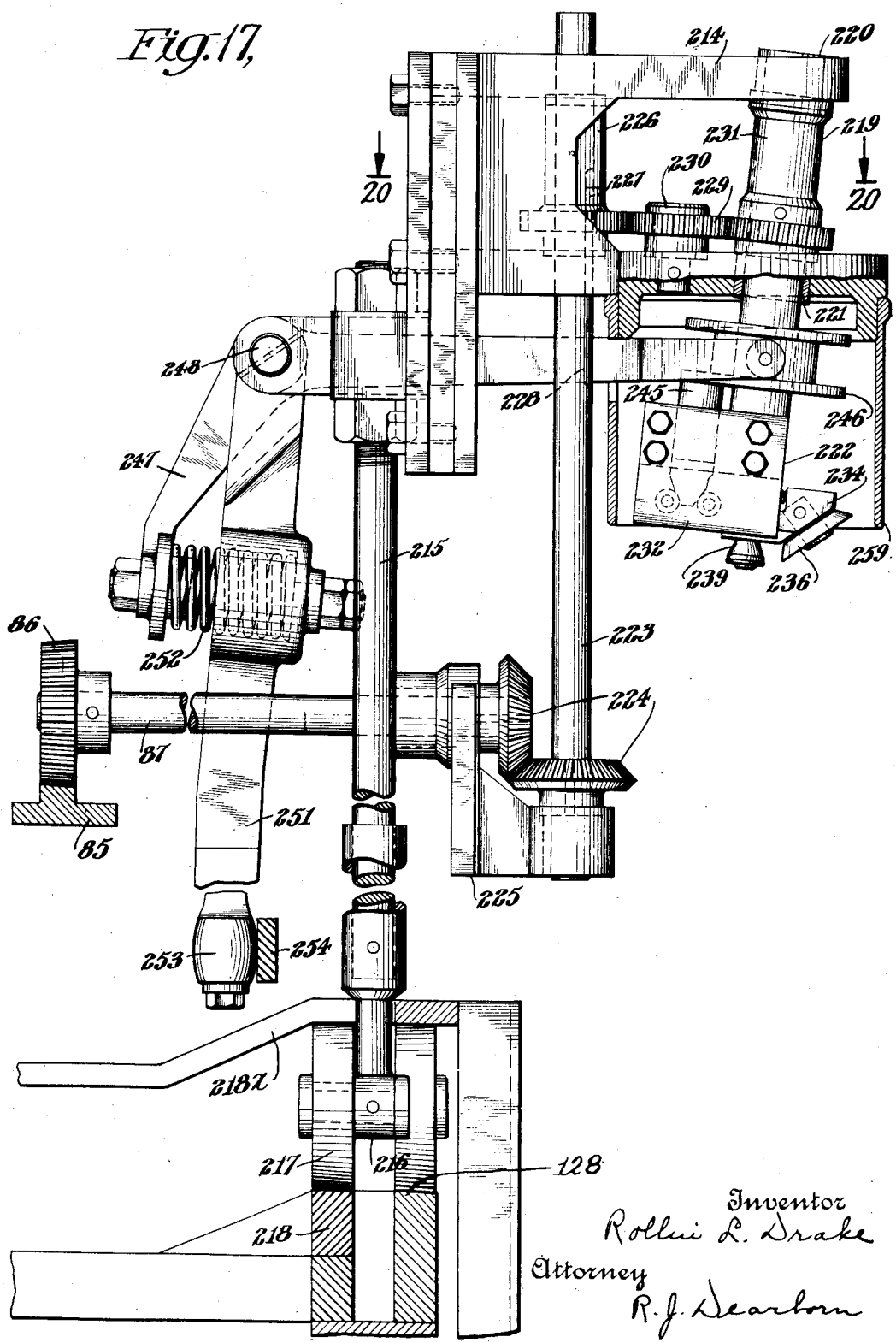

Sept. 22, 1931.  R. L. DRAKE  1,823,889
FILLING AND CAPPING APPARATUS
Filed Aug. 13, 1924   17 Sheets-Sheet 13
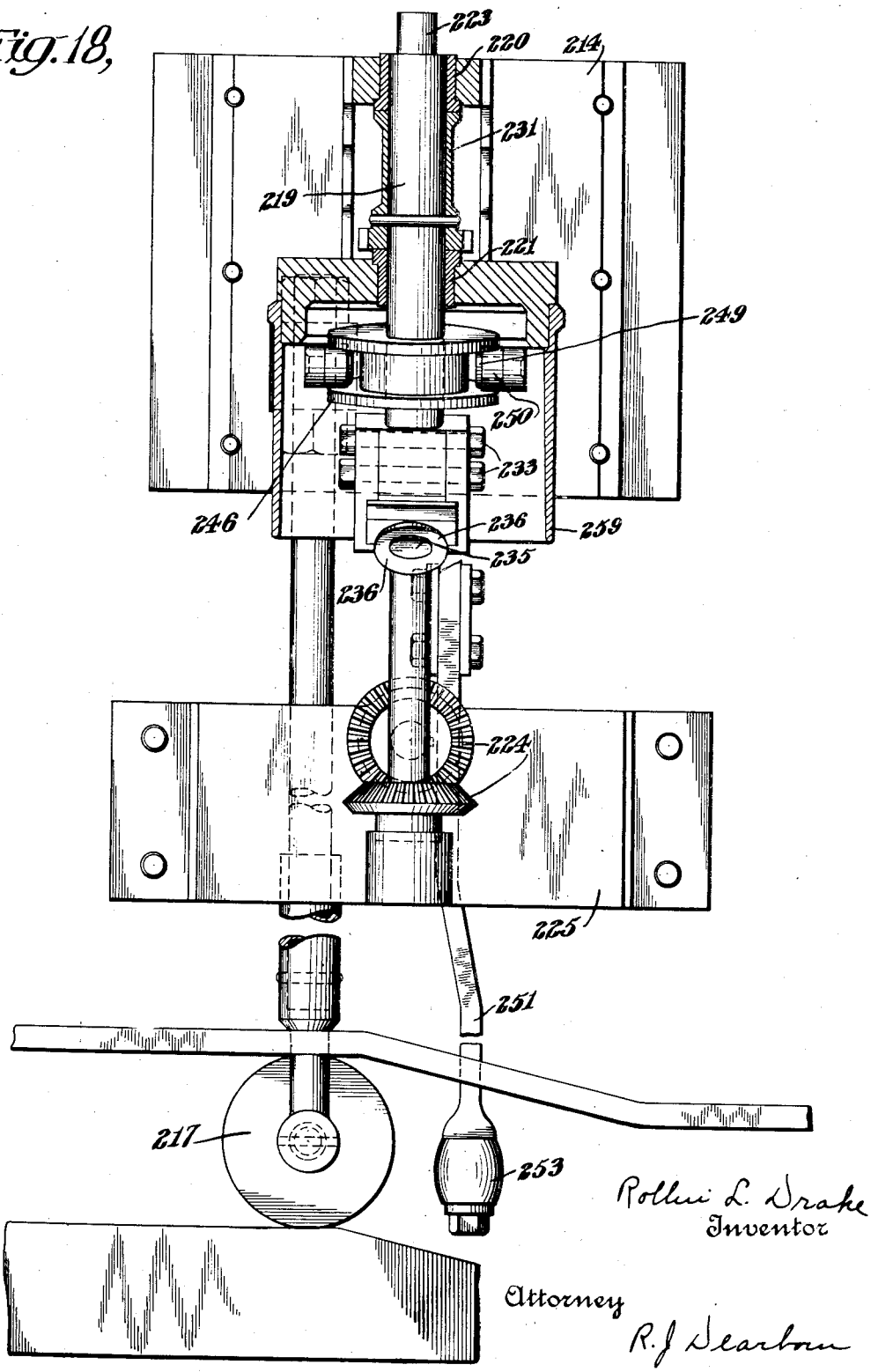
Fig.18,
Rollin L. Drake
Inventor
Attorney
R. J. Dearborn

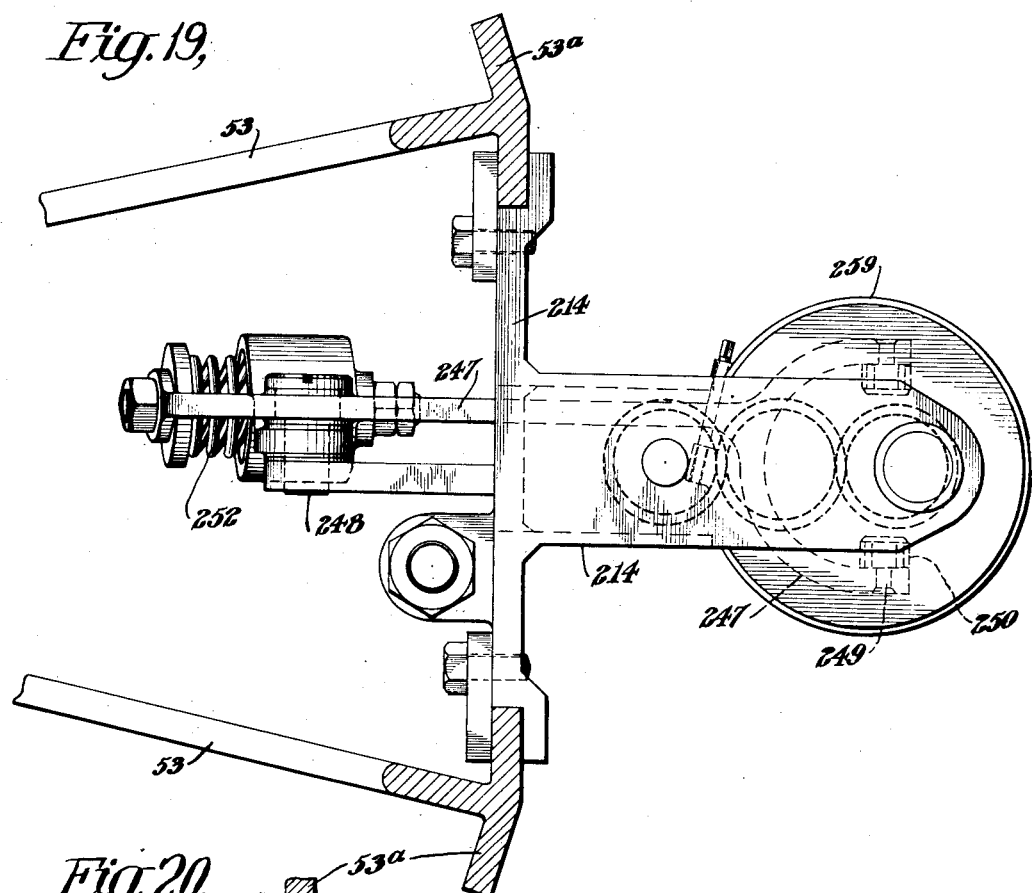
Fig. 19,
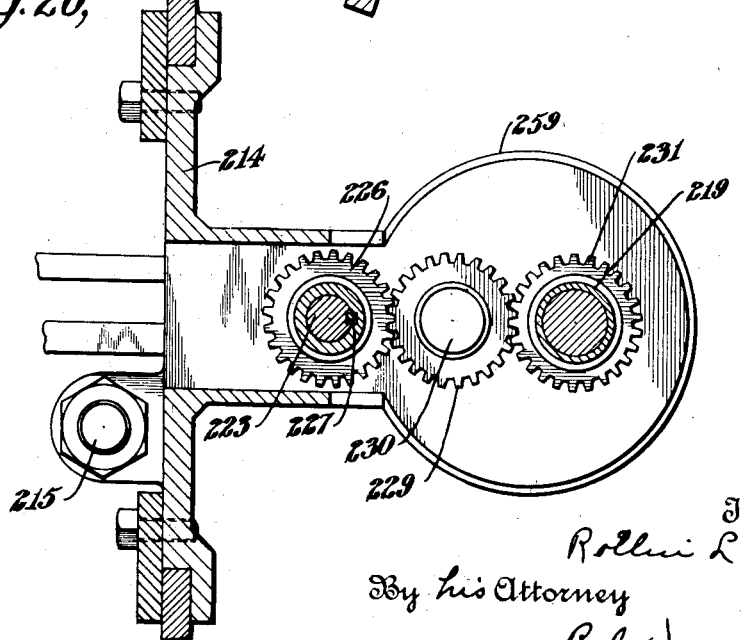
Fig. 20,
Inventor
Rollin L Drake
By his Attorney
R J Wearton

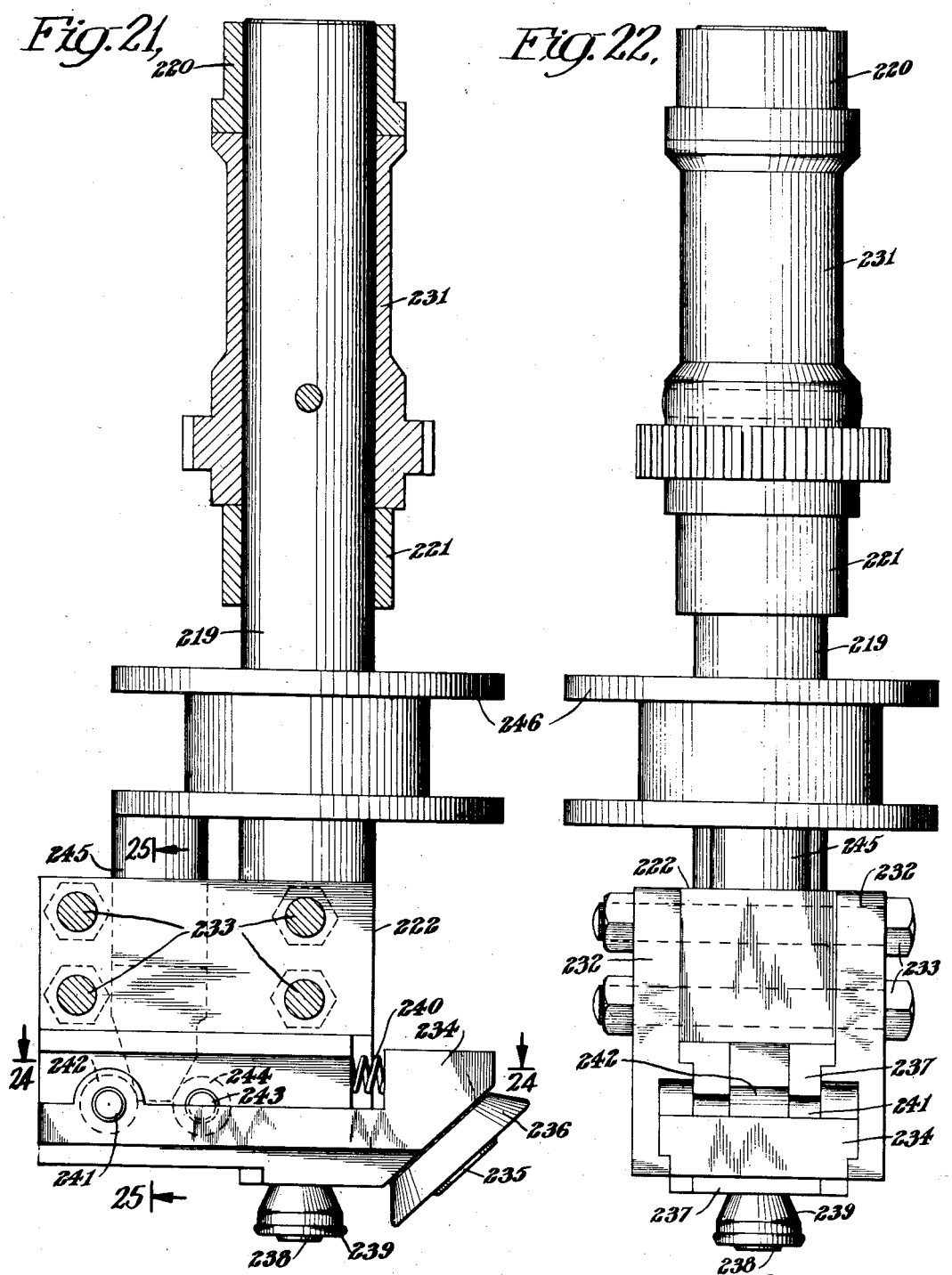

Sept. 22, 1931.    R. L. DRAKE    1,823,889
FILLING AND CAPPING APPARATUS
Filed Aug. 13, 1924    17 Sheets-Sheet 16
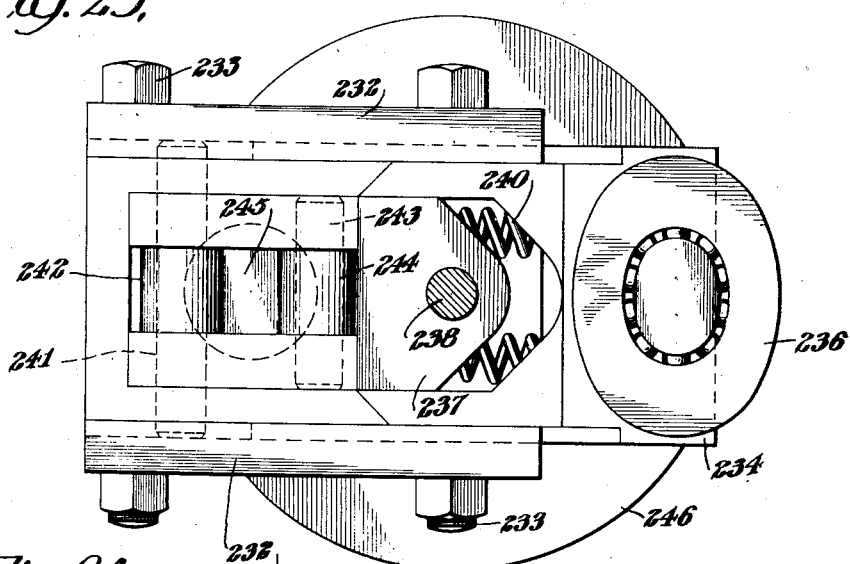
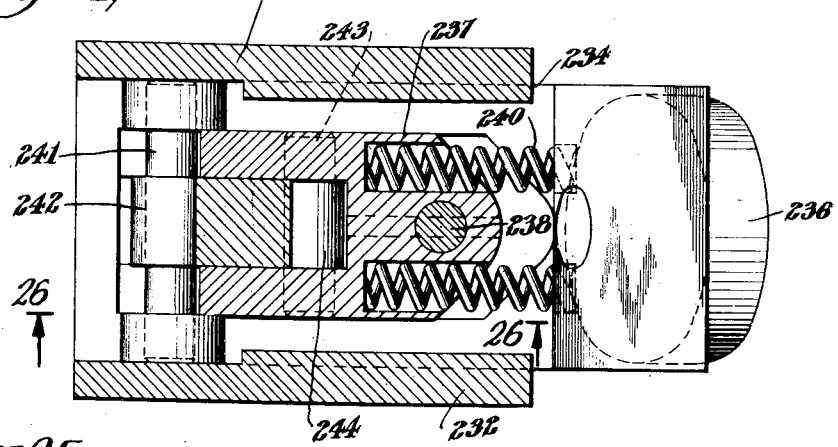
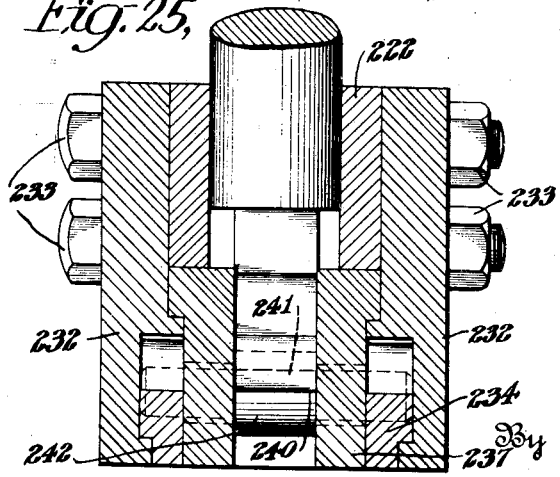
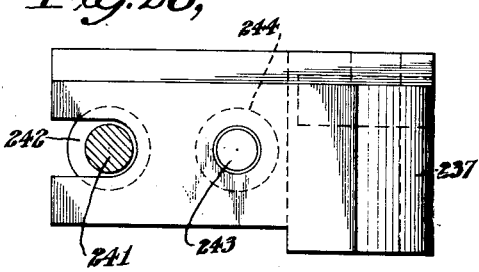
Inventor
Rollin L. Drake
Attorney
R. J. Dearborn Sept. 22, 1931.   R. L. DRAKE   1,823,889
FILLING AND CAPPING APPARATUS
Filed Aug. 13, 1924    17 Sheets-Sheet 17

Inventor
Rollin L. Drake
By his Attorney
R. J. Dearborn

Patented Sept. 22, 1931

1,823,889

UNITED STATES PATENT OFFICE

ROLLIN L. DRAKE, OF PORT ARTHUR, TEXAS, ASSIGNOR, BY MESNE ASSIGNMENTS, TO THE TEXAS COMPANY, OF NEW YORK, N. Y., A CORPORATION OF DELAWARE

FILLING AND CAPPING APPARATUS

Application filed August 13, 1924. Serial No. 731,730.

My invention relates to filling or dispensing apparatus and to apparatus for closing or capping containers.

Certain novel features of the invention may be briefly set forth as follows:

The provision of a complete and unitary machine or apparatus adapted to perform a combined filling and capping operation in which the cans or containers are filled and then closed by suitable caps or sealing means, the arrangement being such that the cans or containers are filled and capped or sealed in a continuous, rapid and efficient manner.

The provision of filling and capping apparatus that is largely automatic in operation requiring a minimum of manual labor or supervision.

The provision of apparatus of a durable and substantial nature, preferably power-operated, that is adapted for large scale filling and capping operations.

The provision of means for accurately weighing or measuring predetermined quantities or amounts of material to be dispensed so that uniform quantities or amounts may be discharged into the containers to be filled.

The provision of valve control mechanism that is actuated or controlled by the scale mechanism, with the co-acting elements of the scale and valve mechanisms being so arranged with respect to each other that the balancing of the scale may operate effectually to operate the valve but at the same time the connected parts will not interfere with the operation of the scale mechanism so as to prevent the attainment of a precise balance in weighing.

The provision of rotary apparatus carrying a plurality of dispensing and capping units so that cans or containers may be introduced at a given point in the cycle of the apparatus and, after being conducted by the rotary mechanism and subjected to the filling and capping operation, may be discharged from the apparatus.

The provision of a rotary element carrying a plurality of dispensing and capping units equipped with suitable synchronizing mechanism by which the several dispensing and capping units are caused to come into operation at predetermined points in the cycle of operation.

The provision of means for so synchronizing or co-relating the filling and capping operations that the combined filling and capping process may be performed in a minimum period of time. To more fully explain this feature it may be stated that the invention contemplates an apparatus in which predetermined quantities or amounts of material to be admitted to the containers are weighed or measured in the same portion of the cycle in which the cans or containers are capped or sealed. In carrying out this feature of the invention the apparatus preferably assumes the form of a rotary machine in which the filling of the containers occurs in a predetermined portion of the cycle of the machine, the capping or sealing operation in another portion of the cycle and the weighing or measuring of the predetermined amounts of material to be dispensed takes place during substantially that portion of the cycle in which the capping or sealing operation is conducted. In other words instead of providing three distinct zones within the cycle for carrying on the successive operations of weighing or measuring the desired quantities of material to be dispensed, charging or filling the containers with material thus weighed or measured and finally capping or sealing the containers, the arrangement is such that the weighing or measuring of the material dispensed in a given cycle takes place substantially during that period of the preceding cycle in which the capping or sealing operation occurs, thus materially reducing the space required for the apparatus and reducing the length of time required for accomplishing the complete dispensing and capping or sealing operation.

The invention contemplates suitable supporting mechanism for the containers to be filled and capped and has in view particularly the provision of means for suporting the containers in an inclined position during the filling operation so that the filling of the same may be facilitated and also the provision of means for moving the supporting means at predetermined times in the cycle so as to properly position the cans or containers for the filling and capping operations, respectively.

The invention seeks to provide apparatus for weighing the material to be dispensed and also has in view the provision of dispensing means, including a dispensing spout, adapted to enter an opening, such as a cap opening with which cans are commonly provided. It may be pointed out, however, that since a scale beam rests on a pivot a scale pan or container carried by the scale beam will describe a somewhat curved path of travel and it is, therefore, not feasible to utilize this pivoted movement to carry the dispensing spout into the opening in the container. In accordance with my invention a dispensing member is interposed between the weighing element and the container or its support. This intermediate member is adapted to receive material from the weighing element and transmit same to the can or container to be filled and has a positive movement of its own irrespective of the movement of the weighing element per se, so that it or its dispensing spout may be actuated to enter the opening in the can or container. This dispensing member is preferably arranged to have a substantially vertical movement intermediate the weighing element and the container.

The invention furthermore seeks to provide novel and improved means for regulating or controlling the passage of material to the weighing element and the passage of material from the weighing element to the can or container. More particularly the invention contemplates the provision of a suitable valve and valve mechanism associated with the weighing mechanism so that the predetermined amount of material may be admitted to the weighing element and also the provision of suitable valve mechanism for regulating or controlling the dispensing of the material thus weighed, as is hereinafter fully set forth.

One important feature of the invention that may be noted consists in the provision of means for preventing the discharge of material from the dispensing apparatus in case no can or container is properly placed to receive same and in the preferred embodiment of this feature valve-actuating mechanism is provided which includes a member adapted to come in contact with the can or container so that, if the can or container is positioned to receive the material to be dispensed, the valve opening mechanism will be actuated accordingly and if the can or container is not thus placed the valve opening mechanism will not come into play.

Another important feature is the provision of means for preventing the admission of additional material to the scale pan while the scale beam remains balanced. Thus in case the contents of the scale pan be not discharged in a given cycle there is no danger of overflowing the pan.

The invention has in view the provision of suitable means for removing the cans or containers from the filling or capping apparatus and contemplates in particular the provision of means adapted to engage the container without injury thereto and discharging it from the machine in a minimum period of time.

Another novel feature of the invention consists in the provision of a combined reaming apparatus and dispensing spout by which material may be discharged into a can or container through an opening therein simultaneously with the reaming or preparing of the opening for the subsequent capping or sealing operation.

The apparatus of my invention is adapted for dispensing various kinds of fluids or flowable or liquescent materials. It is especially adapted for dispensing such liquids as oil whether of the lighter grades, as gasoline, kerosene and the like, or heavier or more viscous oils, such as lubricating oil, etc., which it is frequently desired to can and market in great quantities.

The above features of the invention are more fully disclosed, and other features, advantages and objects of the invention are set forth, in the following detailed description of a specific and preferred embodiment of the invention, the invention having particular reference to certain novel features of construction and arrangement of parts an example of which is given in this specification, illustrated in the accompanying drawings and the novel features of which are set forth in the appended claims.

In the drawings:

Figure 1 is a partial view in sectional elevation of a filling and capping machine constructed in accordance with the invention and constituting an embodiment thereof.

Figure 2 is a partial plan view with some parts omitted and showing certain features in section along planes taken at different elevations.

Figure 3 is a sectional plan view taken on line 3—3 of Figure 1 showing in particular certain cams employed.

Figure 4 is an enlarged section showing the mechanism for regulating the flow of fluid into a supply tank used.

Figure 5 is a section taken on the line 5—5 of Figure 4.

Figure 6 is a sectional elevation of a weighing and filling unit.

Figure 7 is a plan view of same.

Figure 8 is an enlarged view in elevation partially in section showing a weighing element with accompanying valve mechanism.

Figure 8A is a disassembled view in side elevation of a trip element employed.

Figure 8B is an end elevation of same.

Figure 8C is a detail of the pawl controlled by the trip element shown in figures 8A and 8B.

Figure 9 is a vertical section of a filling unit.

Figure 10 is an enlarged section taken on line 10—10 of Figure 9.

Figure 13 is a sectional elevation of a table or support for the can or container.

Figure 14 is a section in detail taken on line 14—14 of Figure 13.

Figure 15 is a plan view of the table and can ejecting mechanism.

Figure 16 is an enlarged section taken on line 16—16 of Figure 15.

Figure 17 is a side elevation of a capping unit.

Figure 18 is a front elevation of a capping unit.

Figure 19 is a plan view of a capping unit.

Figure 20 is a section taken on line 20—20 of Figure 17.

Figure 21 is an enlarged view in side elevation, partially in section showing the shaft and head of the capping unit.

Figure 22 is a front elevation of same.

Figure 23 is a bottom view of same.

Figure 24 is a section taken on the line 24—24 of Figure 21.

Figure 25 is a vertical section taken on the line 25—25 of Figure 21.

Figure 26 is a section in detail taken on the line 26—26 of Figure 24.

Main machine

Figure 12:
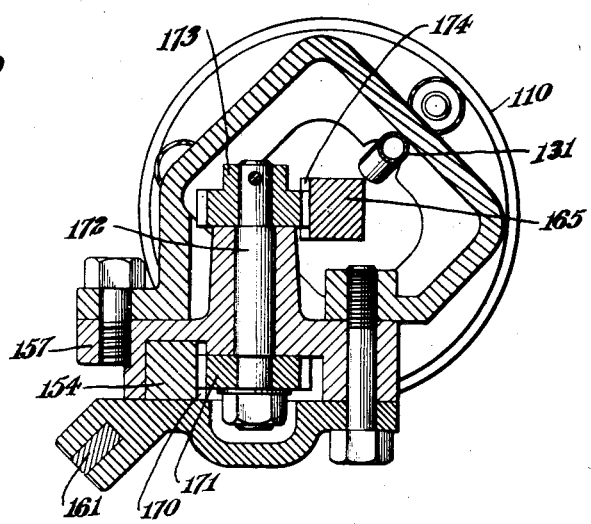
Figure 12 is an enlarged section taken on line 12—12 of Figure 11.

By reference to Figure 1 of the drawings it will be seen that in the particular embodiment of the invention thus illustrated the apparatus includes a hollow base or supporting element 50 through which extends a shaft 51 provided with a hub 52 carrying a plurality of radial arms 53. As illustrated, the shaft 51 may be formed with a flange or collar 54 by which the hub is secured thereto, as by means of set screws 55. The shaft 51 works within an upper bushing 56, lower bushing 57 and an intervening sleeve 58. The pedestal 50 may conveniently be formed with a hollowed out portion 59 to form a lubricant housing or reservoir for the main bearings of the shaft 51 located therein. The main bearing is shown as consisting of ball bearings 60 and ball races 61. An alignment plate 62, supported by the closure plate 63, serves to hold the bearings in proper position. The shaft 51 is hollow to accommodate a supply pipe 64 which serves to admit to the apparatus the fluid to be dispensed. The plate 63 is formed with a central opening through which the supply pipe 64 passes; a guide plate 65 may be provided to form a closure about the supply pipe. A lubricant overflow pipe 66 may be provided.

Power for operating the apparatus may be supplied by a shaft 67 suitably mounted in bearings 68 and operated by any convenient means. The shaft 67 carries a bevel pinion 69 which meshes with a bevel gear 70 mounted on shaft 71 suitably supported in a bearing block 72. The shaft 71 carries a pinion 73 in mesh with a ring gear 74 which is secured to the several arms 53. It is apparent that when the shafts 67 and 71 are rotated the apparatus embracing the several filling and capping units is rotated upon the shaft 51 as an axis.

The shaft 67 may also be geared to an intermediate shaft 75, as by means of bevel pinions 76. The shaft 75 is shown mounted in lower bearing 77 and upper bearing bracket 78 and carries a pinion 79 in mesh with a ring gear 80 which is shown as being rotatably mounted in a combination bearing comprising a radial bearing 81 secured by a retainer ring 82 and a thrust bearing 83 supported on an annular seat 84. The ring gear 80 carries a bevel ring gear 85 which meshes with a plurality of pinions 86 mounted on shafts 87. The inner ends of the shafts 87 are shown as being supported on bearing brackets 88 attached to the hub 52. The shafts 87 serve to operate the several capping units, as is hereinafter more fully explained.

It is desired to maintain a reservoir or supply of the fluid or material which is to be dispensed by the several weighing and filling units. Thus a tank 89 is suitably arranged to receive fluid from the supply pipe 64. As illustrated, the bottom of the tank 89 is recessed to accommodate the upper end of the shaft 51, the tank thus being supported on the shaft 51 and hub 52. At the upper end of the shaft 51, as clearly shown in Figure 4, is an annular housing 90 having a plurality of roller bearings 91. The bearing housing is held in position by a retainer ring 92.

It is preferable to provide float-controlled mechanism to regulate the discharge of fluid from the pipe 64 into the reservoir 89 and in the arrangement shown in Figures 4 and 5 a float 93, which is preferably of annular formation, is adapted to control a valve 94 which regulates the discharge of fluid from the pipe 64 to the tank 89. In the particular construction illustrated the pipe 64 is connected to the valve casing 94 by means of a special fitting 95 and nipple 96. The fitting 95 includes a bracket member 97 which supports a pin 98. A pair of arms 99 is provided, one end of each arm being pivotally mounted on the pin 98. The other ends of the arms are pivoted on pins 100 carried on brackets 101 attached to the float 93. The movement of the pin 98, as actuated by the float 93, is transmitted to a valve lever 102 by means of an arm 103 and link 104. Attached to the outlet port of the valve is a connection 105 which preferably communicates with a plurality of discharge pipes 106 extending to near the bottom of the tank so that the discharge of fluid thereinto may be accomplished with a minimum of disturbance of the fluid contents and also so that, if desired, fluid may be drawn from the tank by these same lines and removed by the pipe 64. It is thus apparent that by means of the float mechanism controlling the valve 94 a predetermined liquid level may be maintained in the supply tank 93. A plurality of discharge pipes 107 extend from the supply tank 89 to the several filling units, the discharge pipes being preferably provided with valves 107a. A drain pipe 108 may, if desired, be provided.

Filling unit

As shown in Figure 1 each of the several filling or dispensing units includes a weighing receptacle 109 which is adapted to receive a predetermined quantity of liquid from the reservoir 89 and an intermediate or dispensing member 110 by which the contents of the weighing receptacles are transferred or directed from the weighing vessel to the can or container to be filled. The various elements of the weighing and filling mechanism are illustrated in detail in Figures 6-12 inclusive, reference to which will now be had for the purpose of giving a complete description of same.

Weighing element

Thus the weighing vessel 109 is suitably supported on a scale beam 111 having pivot members 112 which rest on a bracket 113 that is fixed to the faces 53a of a pair of adjacent arms 53. As clearly shown in Figure 7, the beam 111 is bifurcated and each leg of the beam has a pivot 112 which is supported on a rest 114 mounted on the bracket 113. The outer end of the scale beam is in the form of a yoke 111a upon which the scale pan 109 is pivotally mounted. The weighing vessel is shown provided with a ring or flange 115 by which it is loosely supported on a ring 116 provided with a pair of pivot members 117 seated on rests 118 positioned in the yoke 111a. The inner end of the beam 111 is connected to one end of a scale screw 119 the other end of which is secured in a leg 120 attached to a graduated bar 121. The screw 119 is provided with a limit cup 122 and with a poise 123 the periphery of which may be graduated, the scales on the bar and poise being of any desired denomination. It is understood that in use the scale is set for a predetermined weight and the desired weight of fluid is automatically discharged into the scale pan 109 as is hereinafter fully explained.

Dispensing member

The intermediate member 110 is secured to a bracket 124 which is slidably mounted between faces 53a of a pair of adjacent arms 53. The bracket is supported on a push rod 125 carried on a stud 126 and roller 127 which travels on cam track 128. By reference to Figure 3 it will be seen that the cam 128 embraces an inclined portion 128a leading to the elevated section 128b and another inclined section 128c leading to the lower level 128d and it is apparent that as the roller 127 of a given filling unit travels over the circular cam track the funnel member 110 is raised and lowered, being in the lowered position while dispensing and being in the raised position while the can or container is being closed or capped, as is hereinafter more fully explained.

The member 110 is preferably more or less in the form of a funnel to facilitate the transfer to the can or container of the fluid received from the weighting vessel 109. Ordinarily it is desirable to provide a discharge spout or nozzle 130 adapted to fit snugly in the opening in the container into which it discharges. Thus the spout 130 may be made of such diameter with respect to the opening in the can or container that no foam or liquid can escape about the spout during the filling operation. A vent pipe 131 is provided to permit the escape of air from the can or container while same is being filled and to take care of the foaming caused by displacement of air in the container during the filling operation. The pipe 131 extends upwardly within the receptacle 110 and terminates in an inverted U bend at 132. It is thus possible to dispense fluid, that is to transmit fluid from the weighing vessel 109 to the container to be filled without spilling same.

The spout 130 may be arranged and adapted to ream the opening in the can. Thus the spout may be made of hardened and ground steel and constructed in the form of a perfect cone so that when the spout descends into the can opening it reams the opening, smoothing out any dented edges and preparing the opening for the capping operation. As is pointed out hereinafter, it is desirable to support the can or container during the filling operation in a tilted or inclined position and the reaming spout is arranged accordingly. Thus that portion of the spout which reams or closes the cap hole may be turned on a different center than that of the cone spout as a whole, and this section of the spout may be so formed, that when the spout has descended into the can, a cross section of the spout taken on the plane of its contact with the can forms a circle. The spout thus conforms to and completely fills the opening.

Valve mechanism

The discharge of fluid from the supply tank 89 to the weighing vessel 109 is controlled by a valve 133 seated within a valve casing 134 which is in communication with the pipe 107. The stem or push rod 135 of the valve 133 is connected to one leg of a bell crank lever 136 which is pivoted on a pin 137 that may be supported on a bracket 134a. The other leg of the bell crank 136 is connected, as by means of a link 138, to a trip dog, 139. The dog is preferably of bell crank formation, the link 138 being connected to one leg thereof, and is pivotally supported on a stand 140 which is attached to the bracket 113.

A trip pawl 141 is pivotally supported on a lift rod 142 attached to the slidable bracket 124. The pawl 141 is adapted to engage the free end of the dog 139. The scale beam 111 carries a trip 143 which is adapted to engage a lug 141a on the pawl 141. As clearly shown in Figures 8a and 8b the trip 143 is formed with an extension 143a which constitutes a cam intended for a purpose that is hereinafter explained.

In opening the valve 133 the upward movement of bracket 124 and lift rod 142 causes the pawl 141 to engage the dog or bell crank member 139. The movement thus imparted to the dog is transmitted by the link 138 to the bell crank lever 136 and the valve stem 135 is thus actuated to raise the valve 133 off its seat.

The closing of the valve is effected by the balancing of the scale beam 111. Thus when the weight of liquid for which the scale is set has been discharged into the weighing vessel 109 the outer end of the beam moves downwardly in balancing, causing the trip 143 to engage the lug 141a on the pawl 141 and release same from engagement with the dog 139. The valve 133 is thereby permitted to close by gravity. It will be observed that during the balancing of the scale beam none of the parts of the valve actuating mechanism are in such contact with the beam as to create any friction therewith and thus prevent the attainment of an accurate balance. The scale parts are free to balance and when the balance is obtained the momentum of the beam operates to actuate the valve closing mechanism.

The mechanism is preferably so arranged that so long as the beam 111 remains balanced, that is, so long as the contents of the scale pan 109 are not discharged, the valve 133 cannot be opened to admit additional quantities of fluid to the scale pan. Thus in case in a given cycle, after the scale beam has been balanced by the filling of the scale pan, the contents of the scale pan be not subsequently discharged in regular order in that cycle, the raising of the bracket 124 and lift rod 142 will not operate to open the valve 133, for in this instance the trip 143 is tipped slightly outward on the balanced scale beam 111 and as the pawl 141 is raised the lug 141a engages with the cam 143a of the trip which operates to cam the pawl 141 away from, and prevent its engagement with, the dog 139.

The weighing vessel 109 is provided with an outlet valve 144 the opening of which is dependent upon the placing of a can or container in position to be filled beneath the dispensing member 110. The valve 144 is preferably connected to its rod or stem 145 by means of a U member 146, as illustrated, one leg of member 146 being provided with an opening of appreciably larger diameter than that of the stem 145. Thus when the scale is balancing the stem 145 is suspended freely through this opening and contact with the valve 144, seated in the bottom of the weighing vessel 109, is avoided. It will be observed that during the balancing operation there is nothing in contact with the weighing vessel that will interfere with the attainment of a correct balancing of the beam 111 by reason of the fluid discharged into the weighing vessel.

The valve stem 145 carries a disc 147 adapted to engage the upper leg of U member 146 when the stem is moved upwardly. The stem is connected to one end of a rocker arm 148 which is pivoted on a pin 149 suitably supported in any convenient manner, as for instance, on a bracket 150 attached to the valve casing 134. The other end of the rocker arm is connected to a rod 151 the lower end of which terminates in a cylindrical member 152, preferably hollow, which is slidably mounted in a sleeve 153 fixed to the slidable bracket 124 or to a lug or bracket attached to the member 110. The rod 151 is preferably equipped with a collar 151a so that the weight of the rod and elements connected thereto may be supported on the sleeve 153 during the balancing of the scale beam 111. The weight of these members, however, is not sufficient to raise the valve 144 off its seat when the support of the sleeve is withdrawn due to the lowering of the bracket 124.

A cam rod 154 is slidably mounted on the dispensing member 110 and carries a cross bar 155 which, in the lowering of the dispensing member, is adapted to engage with a can or container A, as shown in Figure 9. The rod 154 is shown as guided in a bracket 156 and in a bracket or housing 157 which brackets are attached to the dispensing member 110. As clearly shown in Figure 10, the rod 154 may be guided between rollers 158 mounted on studs 159 secured in the bracket member 156. As illustrated in Figure 9 the rod 154 has a cam surface that is adapted to be engaged by a roller 160 carried by a push lever 161 one end of which is pivotally secured to the bracket member 157. The other end of the lever 161 is connected to a push rod 162 which extends through an opening in the sleeve 153 and is adapted to engage in a slot or opening in the cylindrical member 152. The push rod 162 is provided with a resilient member 163 which tends to hold the rod out of engagement with the cylinder 152.

When a can or container A has been positioned beneath a given dispensing member 110 the lowering of this member causes the bar 155 to come in contact with the top of a container A and thus stops any further downward movement of the cam rod 154. The dispensing member 110, however, continues its downward movement until the spout 130 is properly seated in the opening in the container. The roller 160 is thereby caused to travel on the cam surface in the rod 154 and thus actuates the lever 161 to push the rod 162 into engagement with the slotted or hollow cylinder 152. The cylinder and valve rod 151 is thus, by reason of the movement of the member 110, moved downwardly rocking the arm 148 and exerting a pull on the valve rod 145 so as to raise the valve 144 off its seat. In case there is no container under the dispensing member 110 it is apparent that the valve 144 will not be opened and consequently the fluid in the weighing vessel will not be discharged.

While not necessary to provide a valve to control the outlet of the dispensing member 110, it is generally preferable to have such a valve, since there may be more or less drip from the spout of the dispensing member after it has discharged liquid into a container. Thus a valve 164 may be provided. This valve is shown as having a seat at the tip of the spout 130 and as having a stem 165 the lower portion of which is preferably of reduced diameter on account of the restricted space within the spout. A lower guide ring 166 and upper guide ring 167 may be provided. The upper ring has a central boss 168 which constitutes a bearing through which the stem 165 passes and also serves as a seat for a resilient member 169 which tends to hold the valve on its seat.

Figure 11:
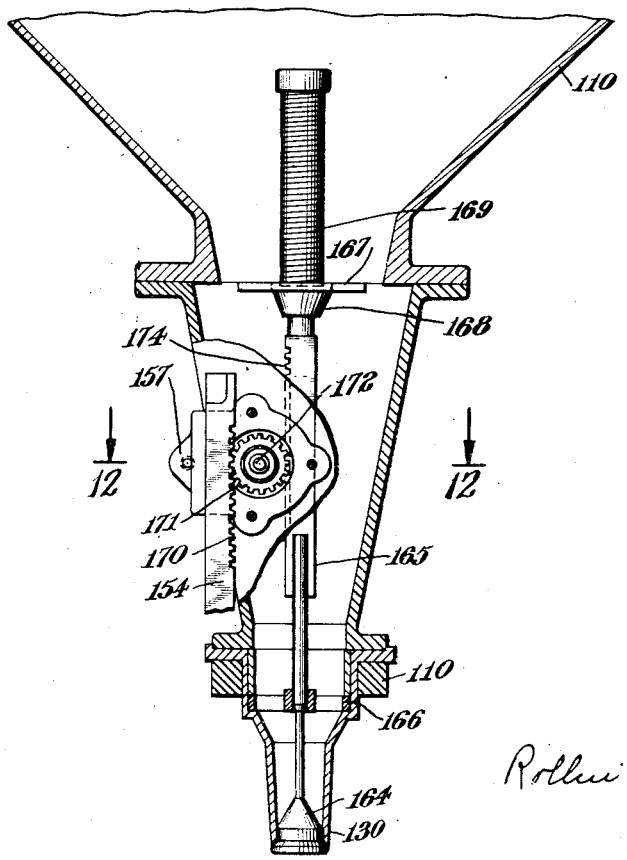
Figure 11 is a section of the funnel portion of a filling unit.

The opening of the valve 164 may well be accomplished in cooperation with the mechanism for controlling the opening of the outlet valve 144 of the weighing vessel 109. Thus, as shown in Figures 11 and 12, the cam rod 154 may have a rack portion 170 which cooperates with a pinion 171 mounted on a shaft 172. As shown in Figure 12 the bracket or housing 157 constitutes a bearing block for the shaft 172. This shaft also carries a pinion 173 which meshes with a rack 174 formed in the valve stem 165. It will be seen that, in the downward movement of the bracket 124 and dispensing member 110, when the cross bar 155 comes in contact with the container A, the stem 165 is caused to descend at a greater speed than the spout 130 on account of the rack and pinion connection between the stem 165 and bar 154, the downward movement of which is arrested when bar 155 comes in contact with the container. The valve 164 is thus opened permitting the fluid discharged from the weighing vessel 109 to the dispensing chamber 110 to flow into the container. When the member 110 is raised, after its contents have been discharged, the spring 169 operates to close the valve 164.

*Support unit*

Each filling and capping unit includes means for properly supporting the container A under the filling and capping mechanism. Apparatus adapted for this purpose is illustrated in Figures 13–16 inclusive. Thus, as clearly shown in Figure 13 a table or support 175 is mounted on a shaft 176. The shaft may be provided with a collar 177 and the shaft thus journaled on a thrust bearing 178 supported on a bracket member 179 that is secured to a pair of adjacent arms 53 or faces 53a thereof.

In order to hold the can or container A in proper position for the filling and capping operations appropriate gripping or retaining means is provided. In the apparatus illustrated the table 175 is formed with a plurality of slots 180 (see Figures 15 and 16) through which gripping means is arranged to protrude for the purpose of engaging the can. The type of mechanism shown is adapted to accommodate square cans or containers but the specific design may of course be varied to suit the particular type of container to be filled. As shown in Figure 16 jaws 181 are mounted on pins 182. Each jaw member is in effect in the form of a lever fulcrumed on a pin 182 with one end of the lever adapted to pass through a slot 180 and thus engage the container A. The other end of each jaw member 181 is connected, by means of a link 183 and pin 184 mounted on lugs 185, to a clutch member 186 which preferably assumes the form of a disc or plate slidably mounted on the shaft 176. A clutch lever 187 is provided for actuating the clutch plate 186. The clutch lever is pivotally mounted on a pin 188 supported on a bracket 189. One end of the lever 187 is in the form of a yoke that is adapted to engage in a peripheral groove in the clutch member 186. Each member of the yoke may well be provided with a stud 190 carrying anti-friction rollers (not shown). The other end of the clutch lever is equipped with a roller 191 adapted to engage a cam 192. In the arrangement illustrated the clutch lever 187 and clutch plate 186 are actuated by gravity to cause the jaws 181 to be raised above the surface of the table 175 and grip the container A. When the roller 191 engages with the cam 192 the cam end of the lever 187 is depressed and the clutch end of the lever is raised, thus releasing the jaws 181 from engagement with the container A. The cam 192 is so arranged that the gripping means 181 is held below the surface of the table 175 to permit the filled and capped container to be discharged from the machine and a new one substituted in its place. (See Figure 3.)

The table 175 is mounted at an angle, as clearly indicated in the drawings, so as to position the container thereon in an inclined or tilted position. The position of the dispensing member 110 and spout 130 is so arranged with respect to the table 175 that the spout may be inserted in an opening in the can on the elevated side. In this way the container can be more readily filled to capacity than if it were supported in a level position.

Means is provided for moving the table 175 so as to change the container A from the filling position to the capping position and vice versa. Thus the shaft 176 carries a pinion 194 adapted to cooperate with racks 195 and 196. (For position of racks see Figure 3.) The rack 195 is adapted to rotate the table 175 from the filling to the capping position and rack 196 is adapted to rotate the table from the capping to the filling position. It is preferable to provide means for holding the table in position after it has been rotated into the position desired. Thus, for example, a lock plate 197, which as illustrated may be constructed integral with the pinion 194, is formed with two holes 198 positioned on a diameter line. A weighted pin 199 carried on one end of a rocker arm 200 and guided in a hole 201 in the bracket 179 is adapted to engage alternately the openings 198 and when so engaged locks the shaft 176 and table 175 against rotation. The other end of the rocker arm 200 is pivotally secured by a pin 202 supported on the bracket 179 and the arm is fulcrumed on a lift pin 203. The latter pin is adapted to engage cams 204 and 205 adjacent the racks 195 and 196, respectively. (See Figure 3.) The cams are adapted to raise the pin 203 so as to raise the lock pin 199 out of engagement with an opening 198 in lock plate 197. The openings 198 and 201 may, if desired, be provided with bushings, as shown, and bevelled approaches to the holes 198 may be formed on the surface of plate 197 so as to insure that the pin 199 will drop into position whenever either of the openings 198 registers with opening 201.

When lift pin 203 comes in contact with cam 204 the lock pin 199 is moved out of engagement with lock plate 197 and the co-action of rack 195 and pinion 194 operates to rotate shaft 176 and table 175. The movement is terminated at the end of half a revolution as the lock pin 199 slips into the other opening 198 which thus serves to prevent overthrow. When the pin 203 comes in contact with the other cam 205 the lock pin 199 is again moved out of engagement with the lock plate 197 and the action of rack 196 and pinion 194 causes another half revolution of the table 175.

Discharge mechanism

The apparatus shown in the drawings for ejecting or discharging the can or container from the machine, after it has been filled and capped, includes a push rod 206 provided with a hand 207. The hand should be of a configuration suitable for the type and size of containers to be used; in the drawings the hand is shown as being in the form of a right angle prong suitable for square containers. Although the push rod 206 and hand 207 may be integral with one another it is advantageous to provide separate parts and to connect them by means of a flexible joint, so that in case of a jam occurring in the discharge of the containers no injury to any of the containers will result. Thus the push rod 206 and hand 207 may be connected by means of a bolt 208 and torsion spring 209.

The push rod 206 is guided and supported in a bracket 210 attached to a pair of adjacent arms 53. The push rod is provided with a stud 211 carrying a roller 212 adapted to travel in a camway 213. The position and formation of the cam 213 is shown in Figure 3. The cam is arranged to so actuate the push rod 206 that it will, after the container has been filled and capped, operate to bring the hand in contact with the container and discharge same from the table 175. It will be observed that the inclination of the camway with respect to the circular path of travel of the filling and capping units is at first at a slight angle and that the angle increases sharply as the apex of the camway at the point of discharge is reached, or in other words the angle of the camway with radii lines of the rotary apparatus approximates a right angle in the first portion of the camway and progressively decreases as the point of discharge is reached. It is likewise preferable to form that portion of the camway, which serves to cause the withdrawal of the ejecting mechanism, with a relatively sharp angle with respect to the path of travel of the filling and capping units. This configuration of the cam insures that the ejecting member shall not be pushed against the container A with undue force so as to injure same and yet that when the ejector has come into contact with the container it will move with increased speed and thus quickly discharge the container from the table, after which the ejecting mechanism is rapidly withdrawn so as to permit another container to be admitted to the table, with a minimum period of time intervening between the discharge of the finished container and the admission of the new container. The container thus removed from the machine may conveniently be discharged to a traveling belt or conveyer 260, as indicated in Figures 1 and 2.

The cam 213 is preferably arranged so as to withdraw the push rod 206, after the discharge of a container, a predetermined distance in order to hold the hand 207 over the table in such a manner that another container A may be properly centered within the openings 180 on the table. It will be noted that the camway 213 comprises a portion that extends approximately concentric with the circular path of travel of the table. The roller 212 traveling in this portion of the camway holds the hand 207 in position so that the container can be placed on the table in proper position. After the container has thus been properly positioned the gripping members 181 engage the container and the hand 207 is completely withdrawn from the table.

*Capping tool*

The specific type of capping tool described herein is illustrated in Figures 17–28 inclusive. The capping mechanism thus shown is adapted to be moved to and from the operating position at predetermined points in the cycle of operation of the machine and is shown as being supported on a bracket 214 slidably mounted on a pair of adjacent arms 53 or faces 53a thereof. Cam-controlled means is shown for actuating the bracket. Thus the bracket is supported on a push rod 215 carried on a stud 216 and roller 217 which travels on a cam 218. It is preferable to form the roller 217, and likewise the roller 127 for the filling unit, with peripheries which constitute surfaces of a cone whose center is the center of the machine or the center of shaft 51, the cam tracks having cooperating surfaces. Such a construction reduces to a minimum the friction on the rollers in passing over the circular cams.

By reference to Figure 3 it will be seen that the cam 218 includes inclined surfaces at 218a and 218b between the upper level 218c and lower level 218d. While ordinarily gravity may be relied on for causing the capping mechanism to be lowered in the operation an additional cam 218x may be provided (see Figure 17) to positively move the capping unit into operating position. A similar cam 128x may be provided for the roller 127 to insure that the dispensing member 110 shall be lowered at the proper time (see Figure 6).

The capping tool includes a shaft 219, shown as being journaled in bushings 220 and 221 supported on the bracket 214, and a block portion 222 illustrated as being integral with the shaft. As hereinbefore pointed out, the several shafts 87 supply power to the several capping units. Each shaft 87 is geared to a shaft 223 by bevel pinions 224, the shaft 223 and outer end of shaft 87 being suitably journaled on a bracket 225 fixed to a pair of adjacent arms 53 or faces 53a thereof. Slidably mounted on the shaft 223 is a sleeve gear 226, the sleeve having a key 227 adapted to travel in a slot 228 formed in shaft 223. Power is transferred from the sleeve gear 226 on shaft 223 to the capper shaft 219, as by means of an intermediate gear 229, mounted on stud 230 supported on bracket 214, and a sleeve gear 231 pinned to the capper shaft.

A pair of side plates 232 is secured to the block 222, as by means of bolts 233. Slidably mounted on shoulders on the side plates is a carriage 234 which carries a pin 235 supporting a roller 236. Slidably supported on the block 222, or preferably in an opening within the carriage 234, is an inner carriage 237 which carries a stud 238 upon which is mounted a roller 239. The rollers 236 and 239 constitute the capper rollers of the mechanism and are arranged at such angles and in such relationship to each other as is desired, having in mind the particular crimping or capping operation it is intended to perform.

Resilient means is provided to exert pressure on the slidable carriages 234 and 237 in such a manner as to tend to move the carriages, and consequently the capper rollers, apart. This resilient means consists of a pair of springs 240 secured in recesses in the carriages. Mechanism, preferably cam-controlled, is provided for moving the carriages against the tension of springs 240 so as to bring the capper rollers into position for the capping operation. Thus the outer carriage is equipped with a pin 241 carrying a roller 242 and the inner carriage is provided with a pin 243 carrying a roller 244. A cam bar 245 is adapted to engage between the rollers 242 and 244 so as to move the capping rollers 236 and 239 towards each other. The cam bar is secured to a clutch member 246 which is slidably mounted on the shaft 219. A lever 247 fulcrumed on a pin 248 has a yoked end with which to engage the clutch 246, each end of the yoke preferably being equipped with a stud 249 carrying a roller 250 adapted to travel in a peripheral groove in the clutch member 246. A cam lever 251 is also pivoted on the pin 248 and is suitably connected to the lever 247, as by resilient connecting means 252. The cam lever carries a roller 253 adapted to engage cams 254 and 254a. The position of the cams with respect to the cycle of operation of the machine is clearly shown in Figure 3. When the roller engages with the cam 254 the lever 251 is moved to the left (as viewed in Figure 17) thereby lowering the yoke end of lever 247. The clutch member 246 is thereby actuated to move the cam point 245 between the rollers 242 and 244 and bring the capper rollers 236 and 239 into capping position. When the roller 253 comes into contact with cam 254a the lever 251 is moved to the right (as viewed in Figure 17) thereby removing the cam bar 245 from engagement between the rollers 242 and 244. The capping tool may be provided with a guard 259.

Figure 27:
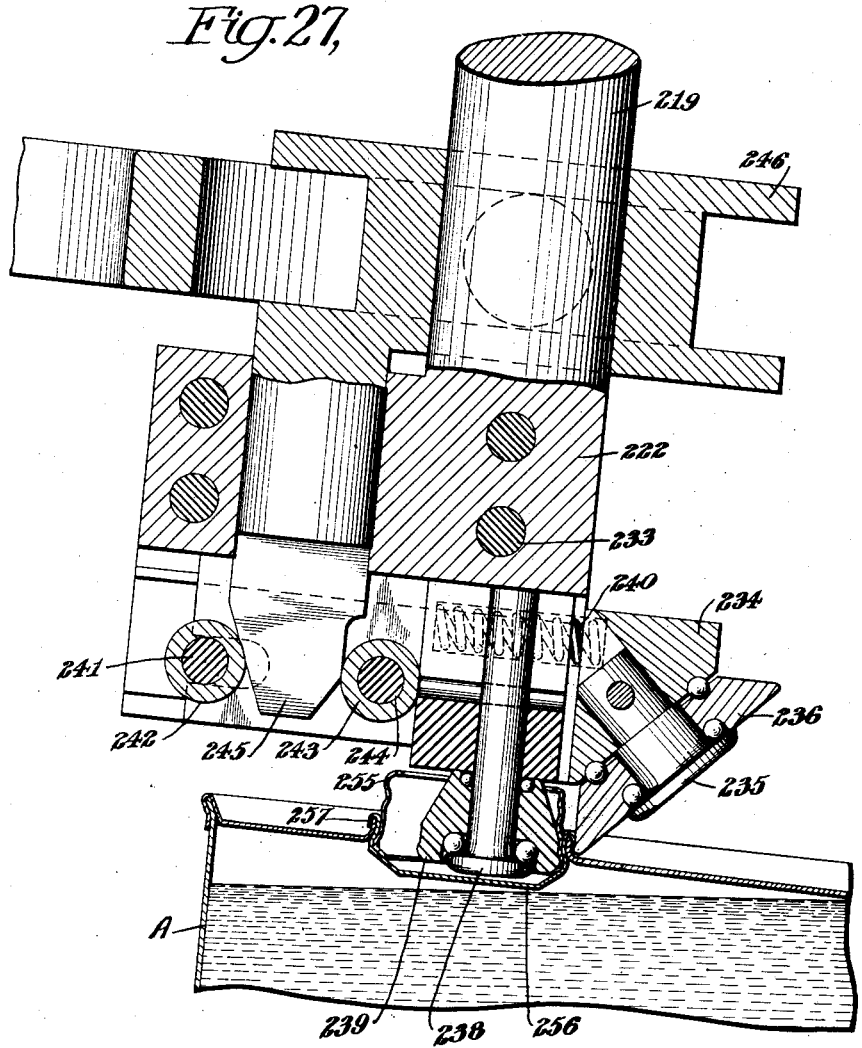
Figure 27 is an enlarged section showing the capping rollers in operation.
Figure 28:
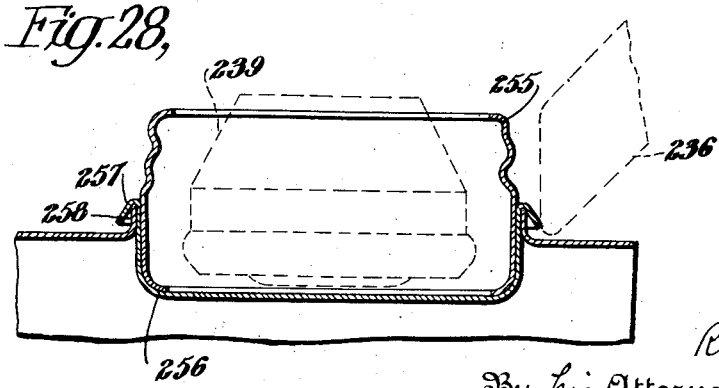
Figure 28 is a section in detail, drawn to a larger scale than Figure 27, illustrating the capper rollers in operation.

For illustrative purposes the capping tool is shown in Figures 27 and 28 as being applied to a screw neck type of cap. Thus the can A is shown with a screw neck or thimble 255 seated in a cap or closure member 256 having a peripheral flange 257 or rim adapted to be spun over a flange 258 formed about an opening in the can A. Figure 28 shows the capping rollers 236 and 239 in position at the beginning of the capping operation and Figure 27 shows the capping mechanism at the completion of the operation with the rim 257 of the closure member 256 spun over the flange 258 and the member 256 bulged or expanded against the radius of, and under, the flange 258 so as to form a seal. It is to be understood that in the practice of the invention various types of tops, caps, or closures may be employed.

*Operation*

In order to explain fully the operation of the filling and capping apparatus described herein the action of a given filling and capping unit in a given revolution of the machine will now be set forth, reference being had particularly to Figure 3 and it being assumed that the rotation of the machine illustrated therein is in a counter clockwise direction.

By means of an operator stationed adjacent the point X, or by means of appropriate feeding mechanism, a can or container A is placed on the table 175 of a given unit, the container being centered against the hand 207.

As the unit revolves roller 191 is disengaged from cam 192, thus permitting the clutch plate 186 to lower and causing the jaws 181 to grip the can.

The push rod 206 and hand 207 are moved inwardly.

Practically simultaneously with the withdrawal of the push-off device the dispensing member 110 is lowered into discharging position. The roller 127 traveling on the inclined portion 128c of the cam track 128 operates to lower the push rod 125, bracket 124 and dispensing member 110. The spout 130 enters the opening in the can and reams same.

In the lowering of the dispensing member 110 the cross bar 155 comes in contact with the top of the can A whereby the valve opening mechanism for the valve 144 is actuated, as has been hereinbefore explained. The weighing vessel 109 will have been filled with fluid in the latter part of the preceding cycle of the given unit and the opening of valve 144 causes the fluid in the weighing receptacle to be discharged into the dispensing member 110. The lowering of the member 110 also causes the opening of the valve 164, as has been hereinbefore explained, and thus the fluid is discharged through the spout 130 into the can A.

After the contents of the scale pan 109 have been thus discharged into the can the roller 127 travels on the incline 128a leading to the elevated portion 128b of the cam track. The push rod 125, bracket 124 and dispensing member 110 are thus raised. The valve 144 is seated by gravity and the valve 164 is closed by the spring 169.

The upward movement of the bracket 124 and lift rod 142 attached thereto causes the pawl 141, to engage the dog 139 thereby actuating link 138 and bell crank 136 so as to open the valve 133. This permits fluid to flow from the supply tank 89 through the pipe 107 into the scale pan 109.

After the dispensing spout 130 has been raised from the can a suitable top, cap or closure, for example a cap of the type illustrated in Figures 27 and 28, is placed in position over the opening in the can, either by an operator stationed at Y or by means of appropriate feeding means. If desired, the cap member may be painted or contacted with a suitable sealing composition.

The table 175 is moved from the filling position to the capping position, the lift pin 203 coming into contact with cam 204 causing the lock pin 199 to be raised and the pinion 194 meshing with rack 195 operating to rotate the table.

The roller 217 of the capping unit has been traveling on the upper level 218c of the cam track. The roller now comes in contact with the inclined section 218a and in passing to the lower lever 218d operates to lower push rod 215 and bracket 214 thus lowering the capping tool into position over the can A. As the capper bracket descends the roller 253 comes in contact with cam 254 and the lever 251 is caused to actuate the clutch lever 247 and cam bar 245 so as to move the capper rollers 239 and 236 toward each other, as has been hereinbefore explained. The capper rollers engage the cap or closure member and spin or roll same to form a tight seal or closure.

After the cap or closure has thus been crimped or spun into position the roller 217 moves up incline 218b and thus raises the capping tool while the roller 253 comes in contact with the cam 254a thereby releasing the cam bar 245 from engagement between the rollers 242 and 244 and permitting the carriages 234 and 237, actuated by resilient means 240, to move the capper rollers 236 and 239 away from each other.

During the capping operation the scale pan 109 has been filling with liquid. When the weight of the liquid is sufficient to cause the scale to balance the movement of the scale beam 111 in balancing causes the trip 143 to come in contact with the lug 141a and release the pawl 141 from engagement with the dog 139, whereby the valve 133 closes by gravity. The scale pan thus contains a predetermined quantity of liquid and is thus ready for filling another can in the succeeding cycle or revolution. The closing of valve 133 may be arranged to occur at any time before the dispensing member 110 descends again to the filling position, that is at any time before the roller 127 reaches section 128c of its cam track.

The roller 191 engages with the cam 192 and the lever 187 and clutch 186 are thereby actuated to release the gripping means 181 from engagement with the can A on the table 175.

In the meantime the roller 212 has entered the camway 213 and the push rod 206 and hand 207 are actuated to come in contact with the can A and moving across the table 175 eject the can therefrom and discharge it onto the conveyer 260, or otherwise remove the can from the machine as may be desired.

The table 175 is moved from the capping position, back to the filling position, the lift pin 203 coming in contact with cam 205 causing the lock pin 199 to be raised and the pinion 194 meshing with rack 196 operating to rotate the table.

Another can A is then placed on the table 175 and cycle is renewed.

In case in a given cycle no can is placed on the table 175 the valve opening mechanism will not be actuated to open the valves 144 and 164, nor will the valve 133 be opened to allow any additional fluid to be admitted to the scale pan 109, as has been hereinbefore explained.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claims.

What I claim is:

1. A filling and capping apparatus comprising means for simultaneously conveying a plurality of containers to be filled and capped, means for weighing out predetermined amounts of fluid during a given period in the cycle of operation of the apparatus, means for discharging said quantities of fluid into the several containers and means for capping the several containers in substantially that portion of the cycle that the weighing means is in operation.

2. A filling and capping apparatus comprising a rotary element, a plurality of filling units carried by said rotary element and adapted to dispense fluid, means for supporting containers to be filled and capped, a plurality of capping units carried by the said rotary element and adapted and arranged to form closures in the containers at a predetermined period in the cycle of operation of said rotary element and means associated with said filling units arranged and adapted to deliver fluid thereto in substantially that portion of the cycle of operation that said capping units are operating to form closures in the containers.

3. A filling and capping apparatus comprising a rotary element; a plurality of dispensing and capping units carried on said rotary element each of which comprises a weighing element, a filling element adapted to transfer fluid from said weighing element to a container, a capping tool and a support for the container; means for actuating the several weighing elements so that a predetermined amount of fluid is admitted to same at a given period in the cycle of the rotary element and means for actuating the capping tools in substantially the same portion of the cycle.

4. A filling and capping apparatus comprising a rotary element, means carried by the rotary element adapted to support containers to be filled and capped, means for weighing out predetermined amounts of fluid, means for actuating the weighing means during a given period in the cycle of the rotary element, means for dispensing said amounts of fluid and means for sealing the containers adapted and arranged to be actuated substantially in that portion of the cycle in which the weighing means is actuated.

5. A filling and capping apparatus comprising a rotary element, a plurality of dispensing and capping units carried by said rotary element each of which comprises a rotatable table adapted to support a container, a dispensing element and a capping element, means for actuating the dispensing element so as to discharge fluid into the container at a predetermined time, means for actuating the capping element so as to form a closure in the container after it has been filled, and means for actuating the rotary table so as to move the container into the filling and capping positions, respectively, at predetermined times.

6. A filling and capping apparatus comprising a reservoir adapted to contain the fluid to be dispensed; a rotary element; a plurality of radial arms carried by said rotary element; dispensing and capping units mounted on said radial arms each of which units comprises a rotatable support for a container, a scale, a weighing vessel associated with said scale, a slidably mounted dispensing element arranged and adapted to transfer fluid from the weighing vessel to the container, a conduit establishing communication between said reservoir and the weighing vessel, a valve controlling the discharge of fluid from said conduit to said weighing vessel, valve control mechanism therefor adapted to be actuated to close said valve upon the balancing of the scale, a valve controlling the discharge of fluid from the weighing vessel to said slidably mounted dispensing element, valve control mechanism therefore adapted to be actuated to open said valve upon a predetermined movement of said slidable dispensing member, and a slidably mounted capping element; a circular cam track on which the slidably mounted dispensing elements travel, a circular cam track on which the slidably mounted capping elements travel, means for actuating the rotatable supports at predetermined periods in the cycle of the rotary element so as to move the container thereon from the capping to the filling position and vice versa and means for discharging the several containers from the apparatus at a predetermined point in the cycle of the rotary element.

7. A filling and capping apparatus comprising a rotary element, a pair of cam tracks, a plurality of filling and capping units carried by said rotary element each of which comprises a support for a container, a scale, a weighing vessel associated with said scale, a dispensing member adapted to receive fluid from the weighing vessel and transfer same to the container and arranged to travel over one of the cam tracks by which a predetermined vertical movement is imparted to it, a valve controlling the admission of fluid to the weighing vessel, valve control mechanism therefor adapted to be actuated, by a predetermined movement of said dispensing member, to open said valve and adapted to be actuated to close same by the balancing of the scale, a valve adapted to control the passage of fluid from the weighing vessel to said dispensing member, valve mechanism therefor arranged to be actuated by a predetermined movement of said dispensing member and a capping tool adapted to travel on the other of said cam tracks by which said tool is given a predetermined vertical movement.

8. A filling and capping apparatus comprising a rotary element, a pair of cam tracks, a plurality of filling and capping units carried by said rotary element each of which comprises a support for a container, a scale, a weighing vessel associated with said scale, a dispensing member adapted to receive fluid from the weighing vessel and transfer same to the container and arranged to travel over one of the cam tracks by which the member is lowered into the dispensing position at a predetermined time in the cycle of said rotary element and is raised from the dispensing position at a predetermined time in said cycle, means for controlling the admission of fluid into the weighing vessel that is actuated by the upward movement of said dispensing member to permit the passage of fluid and is actuated by the balancing of the scale to stop the passage of fluid, means for controlling the passage of fluid from the weighing vessel to the dispensing member that is actuated by the downward movement of said dispensing member to permit the passage of fluid and a capping tool adapted to travel on the other of said cam tracks by which said tool is lowered into capping position at a predetermined time in the cycle and raised at a predetermined time.

9. A filling and capping apparatus comprising a rotary element, a plurality of dispensing elements slidably mounted on said rotary element, a plurality of capping elements slidably mounted on said rotary element and cam-controlled means for actuating said dispensing elements and said capping elements at predetermined periods in the cycle of the rotary element.

10. A filling and capping apparatus comprising a rotary element, a weighing element carried by the rotary element and comprising a scale beam and a receptacle carried thereon, a dispensing element movably mounted on the rotary element, a capping element movably mounted on the rotary element, a valve controlling the transfer of fluid from said receptacle to the dispensing element, means for actuating said valve adapted to open same upon a predetermined movement of the dispensing element, means for actuating said capping element so synchronized with the capping element as to actuate the capping element when said valve is open, a valve controlling the passage of fluid from the dispensing element and means for actuating said valve adapted to open same upon a predetermined movement of the dispensing element.

11. A filling and capping apparatus comprising a rotary element, a plurality of movable supports adapted to support containers to be filled and capped, a plurality of units carried by said rotary element, said units including dispensing elements and capping elements; cam-controlled means for actuating the dispensing elements to discharge fluid into the containers at a predetermined time in the cycle of the rotary element, cam-controlled means for actuating the capping elements at a predetermined time in said cycle, means for actuating said movable supports at predetermined points in the cycle so as to move the containers from the capping to the filling position and vice versa and cam-controlled means for discharging the containers from the apparatus at a predetermined time in the cycle.

12. A filling and capping apparatus comprising a reservoir adapted to contain the fluid to be dispensed, a rotary element, a plurality of dispensing and capping units carried by said rotary element each of which comprises a capping tool, a support for a container, a scale, a weighing vessel associated with said scale, a dispensing member adapted to transfer fluid from the weighing vessel to the container, a conduit establishing communication between said reservoir and the weighing vessel, a valve controlling the passage of fluid through said conduit, valve control mechanism therefor adapted to be actuated to open said valve at a predetermined period in the cycle of the rotary element and adapted to be actuated by the balancing of the scale to close said valve, a valve controlling the discharge of fluid from the weighing vessel to the dispensing member, valve control mechanism therefor adapted to be actuated to open said valve at a predetermined time in said cycle, means adapted to actuate the capping tool when the valve in the conduit to the weighing vessel is opened, and means for discharging the several containers from the apparatus at a predetermined time in said cycle.

13. A filling and capping apparatus comprising a rotary element, a plurality of dispensing and capping units circumferentially disposed on said rotary element, a plurality of weighing elements associated with said dispensing units, means for actuating the several dispensing units to discharge material at a given period in their cycle of revolution, means for actuating the capping units to operate at a subsequent period in the cycle and means for actuating the weighing elements to operate at said subsequent period in the cycle to weight out predetermined amounts of material for delivery by the dispensing units at a subsequent cycle.

14. A filling and capping apparatus comprising a rotary element, a plurality of dispensing and capping units circumferentially disposed on said rotary element, means for actuating the several dispensing units to discharge material at a given period in their cycle of revolution, means for actuating the capping units to operate at a subsequent period in the cycle and means for delivering to the dispensing units at said subsequent period in the cycle measured quantities of material for dispensing by said units in a subsequent cycle.

15. A filling and capping apparatus comprising a rotary element, a plurality of radial arms mounted on said rotary element, a plurality of dispensing and capping units loosely mounted on said arms, means for supporting containers adjacent the several dispensing and capping units, a cam track upon which said dispensing units are adapted to travel and by which said units are moved to and from the dispensing position at predetermined points in the cycle of revolution, a cam track upon which said capping units are adapted to travel and by which said units are moved to and from the capping position at predetermined points in the cycle, means for actuating the capping units when in the capping position and means for actuating the dispensing units to discharge material when moved to the dispensing position.

16. A filling and capping apparatus comprising a rotary element, a plurality of radial arms carried by said rotary element, a plurality of dispensing and capping units mounted to have vertical movements on said arms, a plurality of rotatable tables for supporting the containers to be filled and capped, means for rotating said tables a predetermined amount at predetermined points in their cycle of revolution, cam tracks adapted to impart said vertical movements to said dispensing and capping units and so arranged with respect to each other as to support the dispensing elements at a lower level at one portion of the cycle and at a higher level at a subsequent portion of the cycle while supporting the capping units during said subsequent portion of the cycle at a lower level than that at which said units are held at the prior portion of the cycle, means for actuating the capping units when held at said lower level and means for actuating the dispensing units to discharge material when at said lower level.

17. A filling and capping apparatus comprising a plurality of radial arms, a plurality of dispensing and capping units mounted to have vertical movements on said arms, cam tracks adapted to impart said movements to said dispensing and capping units, a plurality of rotatable support elements mounted on said arms and adapted to support containers to be filled and capped, means for imparting a predetermined rotary movement to said support elements at predetermined points in the cycle of operation, and means for actuating the capping units to perform the capping operation and the dispensing units to discharge material at predetermined points in the cycle.

18. A filling and capping apparatus comprising a rotary element, a plurality of weighing elements circumferentially disposed on said rotary element, each of which weighing elements includes a scale and a scale pan having inlet and outlet valves, a plurality of dispensing elements circumferentially disposed on said rotary element and adapted to transfer material from the scale pans to the containers to be filled, a plurality of supports circumferentially disposed on the rotary element and adapted to support containers to be filled underneath said dispensing elements, a plurality of capping tools circumferentially disposed on said rotary element, means for moving the several dispensing elements to and from the filling position at predetermined points in their cycle of revolution, valve operating mechanism controlled by movements of the dispensing units adapted to open the scale pan outlet valves when the dispensing elements are in the filling position and adapted to open the inlet valves when the dispensing elements are moved from the filling position and means for actuating the capping tools when the dispensing elements are moved from the filling position.

19. A filling and capping apparatus comprising an endless conveyor, means on said conveyor for supporting a plurality of receptacles, means for measuring a quantity of a substance to be charged into one of said receptacles, means for dispensing a measured quantity of the substance into an empty receptacle, means for capping a filled receptacle, and controlling means for effecting simultaneous operation of said measuring, dispensing and capping means.

20. A filling and capping apparatus comprising an endless conveyor, means for continuously moving said conveyor, means on said conveyor for supporting a plurality of receptacles, means for measuring a quantity of a substance to be charged into one of said receptacles, means for dispensing a measured quantity of the substance into an empty receptacle, means for capping a filled receptacle, and controlling means for simultaneously effecting operation of said measuring, dispensing and capping means.

21. A filling and capping apparatus comprising an endless conveyor, means on said conveyor for supporting a plurality of receptacles, means for measuring a quantity of a substance to be charged into one of said receptacles, means for dispensing a measured quantity of the substance into an empty receptacle, means for capping a filled receptacle, said measuring, dispensing and capping means being carried by said conveyor, and controlling means for effecting simultaneous operation of said measuring, dispensing and capping means.

22. A filling and capping apparatus comprising an endless conveyor, means for continuously moving said conveyor, means on said conveyor for supporting a plurality of receptacles, a plurality of means simultaneously operative to measure quantities of a substance to be charged into said receptacles, a plurality of means for simultaneously dispensing measured quantities of the substance into a plurality of receptacles, a plurality of means for simultaneously capping a plurality of filled receptacles, and controlling means for successively disabling effective ones of said measuring, dispensing and capping means and successively enabling ineffective units of these means, whereby substantially the same number of units of each are constantly effective.

23. A filling and capping apparatus comprising a continuously rotating structure, a plurality of rotatable supporting and holding devices mounted on said structure, each of said devices being adapted to hold a receptacle, means carried by said structure for filling said receptacles, means carried by said structure for capping said receptacles, said holding devices having a definite position with relation to said filling means and another definite position with relation to said capping means, and means for successively rotating said devices to partial extents as they pass a plurality of predetermined points in a cycle of rotation of said structure to carry said receptacles from filling to capping position and vice versa.

24. A filling and capping apparatus comprising a rotary element, a series of quantity determining devices carried thereby, a series of movable dispensing devices carried by said element adjacent said quantity determining devices, and adapted to receive material therefrom, a series of capping devices carried by said element in vertical alinement with said quantity determining devices, means on said element for holding a series of receptacles, means for continuously rotating said element, and controlling means for successively bringing the devices of the several series into action, said controlling means being adapted to maintain a portion of each series of devices in action at all times.

25. A filling and capping apparatus comprising a rotary element, a series of quantity determining devices carried thereby, a series of movable dispensing devices carried by said element adjacent said quantity determining devices, and adapted to receive material therefrom, a series of capping devices carried by said element in vertical alinement with said quantity determining devices, means on said element for holding a series of receptacles, means for continuously rotating said element, and controlling means for successively bringing the devices of the several series into action, said controlling means being adapted to maintain a portion of each series of devices in action at all times, and arranged to bring the vertical alined quantity determining devices and capping devices into action substantially simultaneously.

26. A dispensing apparatus comprising a storage reservoir for material to be dispensed, a scale beam, a container mounted on one arm of said beam, a transmission connection between said reservoir and said container, a movable dispensing element adapted to transfer the material from said container to a receptacle to be filled, a valve in said transmission connection, means controlled upon movement of said dispensing element to open said valve, and means controlled by said scale beam when balanced to permit the closing of said valve, said last mentioned means being so constructed as to permit the free balancing of the beam.

27. A dispensing apparatus comprising a reservoir adapted to contain the fluid to be dispensed, a rotary element, a plurality of dispensing units carried by said rotary element each of which comprises a support for a container, a scale, a weighing vessel associated with said scale, a dispensing member adapted to transfer fluid from the weighing vessel to the container, a conduit establishing communication between said reservoir and said weighing vessel, a valve controlling the passage of fluid through said conduit, valve control mechanism therefor adapted to be actuated to open said valve at a predetermined period in the cycle of the rotary element and adapted to be actuated to close said valve by the balancing of the scale, a valve controlling the discharge of fluid from the weighing vessel to said dispensing member, valve control mechanism therefor adapted to be actuated to open said valve at a predetermined time in said cycle, and means for discharging the several containers from the apparatus at a predetermined time in said cycle.

28. A dispensing apparatus comprising a rotary element, a plurality of movable supports carried by said element adapted to support containers to be filled, a plurality of dispensing units carried by said rotary element, cam-controlled means for actuating the dispensing elements to discharge fluid to the containers at a predetermined time in the cycle of the rotary element, means for subsequently moving the supports of said element, and means for discharging the containers from the apparatus at a predetermined time in the cycle.

29. A dispensing apparatus comprising a continuously moving rotary element, a fluid reservoir carried by said element, a plurality of radial arms carried by said rotary element, dispensing members slidably mounted on said arms, a plurality of supporting elements adapted to support containers beneath the dispensing members, means for actuating the dispensing members at a predetermined time in the cycle of the rotary element to cause same to descend into filling position and means for discharging the containers from the apparatus at a predetermined time in the cycle.

30. A dispensing apparatus comprising a rotary element, a cam track concentric with said rotary element, a plurality of dispensing units carried by said rotary element each of which comprises a support for a container, a scale, a weighing vessel associated with said scale, a dispensing member adapted to receive fluid from the weighing vessel and transfer same to the container and arranged to travel over said cam track by which the member is lowered into the dispensing position at a predetermined time in the cycle of said rotary element and is raised from the dispensing position at a predetermined time in said cycle, means for controlling the admission of fluid into the weighing vessel that is actuated by the upward movement of said dispensing member to permit the passage of fluid into said vessel and that is actuated by the balancing of the scale to stop the passage of fluid, means for controlling the passage of fluid from the weighing vessel to the dispensing member that is actuated by the downward movement of said dispensing member to permit the passage of fluid.

31. A dispensing apparatus comprising a rotary element, a cam track concentric with said rotary element, a plurality of dispensing units carried by said rotary element each of which comprises a support for a container, a scale, a weighing vessel associated with said scale, a dispensing member adapted to receive fluid from the weighing vessel and transfer same to the container and arranged to travel over said cam track by which a predetermined vertical movement is imparted to the dispensing member, a valve controlling the admission of fluid to the weighing vessel, valve control mechanism therefor adapted to be actuated by a predetermined vertical movement of said dispensing member so as to open the valve and adapted to be actuated to close same by the balancing of the scale, a valve adapted to control the passage of fluid from the weighing vessel to said dispensing member and valve mechanism therefor arranged to be actuated by a predetermined vertical movement of said dispensing member.

32. A dispensing apparatus comprising a reservoir, adapted to contain the fluid to be dispensed, a rotary element, a plurality of radial arms carried by said rotary element, dispensing units mounted on said radial arms each of which comprises a scale, a weighing vessel associated with said scale, means for supporting a container beneath the weighing vessel, and a slidable member interposed between said weighing vessel and said support and adapted to transfer fluid from the weighing vessel to the container, a conduit establishing communication between said reservoir and said weighing vessel, a valve controlling the discharge of fluid from said conduit to said weighing vessel, valve control mechanism therefor adapted to be actuated to close said valve upon the balancing of the scale, a valve controlling the discharge of fluid from the weighing vessel to said slidable vessel, valve control mechanism therefor adapted to be actuated to open said valve upon a predetermined movement of said slidable member; a circular cam track on which the slidable member travels and means for discharging the several containers from the apparatus at a predetermined point in the cycle of the rotary element.

33. A dispensing apparatus comprising a rotary element, a plurality of dispensing units carried by said rotary element each of which comprises a support for a container, a scale, a weighing vessel associated with said scale, a dispensing member intermediate said weighing vessel and support and formed with a spout adapted to enter an opening in the container; and a circular cam track concentric with said rotary element and upon which said dispensing members travel whereby a predetermined vertical movement is imparted to said dispensing member.

34. A dispensing apparatus comprising a scale having a beam, a scale pan carried on said beam, a support adapted to support a container to be filled underneath said scale pan, a dispensing member adapted to receive fluid from the scale pan and discharge same into the container and arranged to have a substantially vertical movement intermediate the scale pan and support, a valve normally closing the outlet of said member, and means operated upon the movement of said member for opening the valve.

35. A can filling apparatus comprising a scale having a beam, a scale pan carried on said beam, a dispensing member adapted to receive fluid from the scale pan and discharge same into the can and arranged to have a slidable movement intermediate the scale pan and can, and a valve controlled by the can upon movement of said member normally closing the outlet of said member.

36. A dispensing apparatus comprising a rotary element, a filling unit carried by said rotary element and comprising a weighing element, means for supporting the container to be filled, a movable member intermediate the weighing element and the supporting means; and a stationary cam for actuating said intermediate member.

37. A dispensing apparatus comprising a rotary element, a filling unit carried by said rotary element and comprising a weighing element, means for supporting the container to be filled, a movable dispensing member constantly intermediate the weighing element and the supporting means; and means for imparting a predetermined movement to said dispensing member.

38. In a can filling apparatus, means for supporting a can to be filled, a movable dispensing member formed with a tapered spout forming a continuous circle in cross section and adapted to enter the cap opening of the can and ream same, and means for moving said member toward said supporting means for the purpose specified.

39. In a can filling apparatus an inclined table upon which the can may be positioned, a movable dispensing element having a spout disposed adjacent the more elevated portion of the can, and means for positively moving said element toward the table into co-operation with the can.

40. In a dispensing apparatus, a rotary element, a support for the container to be filled, a weighing element carried by said rotary element and comprising a scale beam and a scale pan carried thereby, a movable dispensing member adapted to receive fluid from said scale pan and transfer same to the container, a conduit adapted to admit fluid to said scale pan, a valve in said conduit, valve control means for same adapted to be actuated to open the valve upon a predetermined movement of said dispensing member and adapted to be closed by the balancing of the scale beam, a valve controlling the discharge of fluid from the scale pan to the dispensing member, and valve control mechanism therefor comprising means adapted to come in contact with the container on said support and arranged to open said valve only when thus contacted.

41. In a dispensing apparatus, a rotary element, a support for the container to be filled, a scale having a beam, a scale pan carried by said beam, a trip member mounted on said beam, a movable dispensing member adapted to receive fluid from said scale pan and transfer same to the container, a pawl carried by said dispensing member, a conduit adapted to admit fluid to said scale pan, a valve in said conduit, valve control means for same adapted and arranged to cooperate with said trip member and pawl so that said means is actuated to open the valve by said pawl upon a predetermined movement of said dispensing member and so that said means is actuated to close said valve by said trip member upon the balancing of the scale beam, a cam associated with said trip member and adapted to prevent said pawl from actuating said valve control means so as to open the valve when the scale beam is balanced, a valve controlling the discharge of fluid from the scale pan to the dispensing member and valve control mechanism therefor comprising means adapted to come in contact with the container on said support and arranged to open said valve only when thus contacted.

42. In a dispensing apparatus, a rotary element, a support for the container to be filled, a weighing element carried by said rotary element and comprising a scale beam and a scale pan carried thereby, a movable dispensing member adapted to receive fluid from said scale pan and transfer same to the container, a conduit adapted to admit fluid to said scale pan, a valve in said conduit, valve control means for same adapted to be actuated to open the valve upon a predetermined movement of said dispensing member and adapted to be closed by the balancing of the scale beam, a valve controlling the admission of fluid to the dispensing member from the scale pan, a valve controlling the discharge of fluid from the dispensing member and valve control mechanism for said valves comprising means adapted to come in contact with the container on said support and arranged to open said valves only when thus contacted.

43. In a machine for filling and capping containers a reservoir for fluid material, an endless conveyor adapted to support a container, means carried by said conveyor for introducing a measured quantity of said material into a container, valves controlled by the movement of said conveyor for regulating the flow of said material to and from said means, and means carried by said conveyor for sealing said container.

44. In a machine for filling containers, a reservoir for fluid material, an endless conveyor adapted to support a container, means carried by said conveyor for introducing a measured quantity of said material into a container, and valves controlled by the movement of said conveyor for regulating the flow of said material to and from said means.

45. In a machine for filling and capping containers a reservoir for fluid material, a continuously moving conveyor adapted to support a plurality of containers, a plurality of dispensing means simultaneously active for introducing said material into a group of said plurality of containers, means for simultaneously applying closures to another group of said plurality of containers, means for operating said conveying means to bring new containers successively into positions where said dispensing means are active and to bring filled containers into positions where said closure applying means are active, and means for discharging said containers successively after the closures have been applied.

46. In a machine of the class described, a reservoir for fluid material, a plurality of dispensing means for introducing said material into containers, a plurality of capping means for sealing containers, means for simultaneously operating certain of said dispensing means and certain of said capping means, a number of said dispensing and capping means being continuously operable by said operating means, and means for conveying containers in operative relation to said dispensing and capping means.

47. In a machine of the class described a continuously moving conveyor for supporting containers to be filled and capped, a plurality of dispensing means adapted to co-operate with said containers, a plurality of capping means adapted to seal said containers, and means controlled by the movement of said conveyor for rendering said dispensing means and said capping means successively active for predetermined and overlapping time intervals.

48. In a machine of the class described a plurality of individual supports for containers to be filled and capped, separate devices associated with each of said supports for measuring a predetermined quantity of material, for dispensing said material into a container and for capping a filled container, and means for simultaneously operating the measuring and capping devices associated with a given support and independently operating the dispensing devices associated with said support, said means operating the devices for performing each function in cyclic succession.

49. In a machine of the class described a plurality of individual supports for containers to be filled and capped, separate devices associated with each of said supports for measuring a predetermined quantity of material, for dispensing said material into a container and for capping a filled container, means for simultaneously operating the measuring and capping devices associated with a given support and independently operating the dispensing devices associated with said support, said means operating the devices for performing each function in cyclic succession and means for shifting each support between the operation of its related dispensing devices and the operation of its related measuring and capping devices.

50. In a machine of the class described means for conveying a plurality of receptacles to be filled, means carried by said conveying means for measuring predetermined quantities of material, dispensing means carried by said conveying means for introducing the measured quantities of material into said receptacles, and means controlled by the movement of said conveying means for operating said measuring and dispensing means.

51. In a machine of the class described a reservoir for fluid material, a plurality of means for measuring predetermined quantities of said material, a plurality of independently movable dispensing means interposed between the measuring means and the containers to be filled for introducing previously measured quantities of said material into the containers, and means for simultaneously operating a number of said measuring and dispensing means.

52. In a machine of the class described a continuously movable conveyor for supporting a container to be filled, a reservoir for fluid material, means for measuring a predetermined quantity of said material, means for controlling the introduction of said fluid from said reservoir into said measuring means, said controlling means being operated at a predetermined point in the movement of said conveyor to begin the introduction of fluid, means operable by said measuring means when the predetermined quantity has been introduced for operating said controlling means to arrest the flow of the fluid, and means operated at a subsequent point in the movement of said conveyor for controlling the discharge of said measured quantity of material into the container.

53. In a machine of the class described a reservoir for fluid material, means for measuring a predetermined quantity of said material, movable dispensing means for introducing the material into a container, valves for controlling the passage of the material from the reservoir to the measuring means and from the latter to the dispensing means, said valves being opened by opposite movements of said dispensing means, and means for independently closing the first mentioned valve when the predetermined quantity of material has been measured.

54. In a machine of the class described a reservoir for fluid material, means for measuring a predetermined quantity of said material, movable dispensing means for introducing the material into a container, valves for controlling the passage of the material from the reservoir to the measuring means and from the latter to the dispensing means, a rod carried by said dispensing means and adapted to engage the container, means controlled by said rod for opening one of said valves, means for opening the other of said valves upon movement of the dispensing means, and means controlled by the measuring means for closing the last mentioned valve.

55. In a machine of the class described a reservoir for fluid material, means for measuring a predetermined quantity of said material, movable dispensing means for introducing the material into a container, valves for controlling the passage of the material from the reservoir to the measuring means and from the latter to the dispensing means, a rod carried by said dispensing means and adapted to engage the container, means controlled by said rod upon movement of the dispensing means for opening the other of said valves, and means for disabling said last mentioned means whenever the first valve is not opened by the rod controlled means.

56. In a machine of the class described, a reservoir, a vessel adapted for measuring a predetermined quantity of material from the reservoir, independently movable dispensing means for transferring the previously measured quantities of material from the measuring vessel to a container to be filled, inlet and outlet valves for controlling the passage of material to and from said measuring vessel, means responsive to the weight of the material in the vessel for controlling the operation of the inlet valve, and means dependent upon the placing of a container in position to be filled through the dispensing means for actuating the outlet valve from said measuring vessel.

57. In a device of the class described, a weighing vessel, a slidably mounted dispensing element arranged and adapted to transfer material from the weighing vessel to a container to be filled, a valve controlling the discharge of material from the weighing vessel to the slidably mounted dispensing element, and valve control mechanism for said valve adapted to be actuated upon a predetermined movement of said slidable dispensing element.

58. In a machine of the class described a reservoir for fluid material, an inclined table for supporting a container to be filled, a movable dispensing member having a spout adapted to be forced into an opening in the elevated side of the container, means for introducing material from said reservoir into said member, an air passage within said member extending from a port in the spout to a point above that at which the material is introduced, and means for moving the member to carry the spout with its port into the container.

59. In apparatus of the class described a weighing vessel, means for introducing fluid material into said vessel, a dispensing member between said vessel and a container to be filled, a valve in said vessel for controlling the discharge of fluid therefrom, a valve in said member, and means for operating said valves in unison.

60. In apparatus of the class described a weighing vessel, means for introducing fluid material into said vessel, a dispensing member between said vessel and a container to be filled, a valve in said vessel for controlling the discharge of fluid therefrom, a valve in said member, means connecting said valves for operation in unison, and means adapted to engage a container for controlling the operation of said valves.

In witness whereof I have hereunto set my hand this 12th day of July, 1924.

ROLLIN L. DRAKE.